US012700033B2

(12) United States Patent     (10) Patent No.:   US 12,700,033 B2

Bukov et al.        (45) Date of Patent:     Aug. 4, 2026

(54) GASLESS DECENTRALIZED TOKEN SWAPS

(71) Applicant: Degensoft Ltd, Dubai (AE)

(72) Inventors: Anton Bukov, Dubai (AE); Sergej Kunz, Dubai (AE)

(73) Assignee: Degensoft Ltd, Dubai (AE)

( * ) Notice: Subject to any disclaimer, the term of this patent is extended or adjusted under 35 U.S.C. 154(b) by 0 days.

(21) Appl. No.: 18/597,619

(22) Filed: Mar. 6, 2024

(65) Prior Publication Data

US 2024/0428209 A1     Dec. 26, 2024

Related U.S. Application Data

(63) Continuation of application No. 18/408,376, filed on Jan. 9, 2024.

(Continued)

(51) Int. Cl.

| | |
|---|---|
| *G06Q 20/02* | (2012.01) |
| *G06Q 20/06* | (2012.01) |
| *G06Q 20/10* | (2012.01) |
| *G06Q 20/36* | (2012.01) |
| *G06Q 20/38* | (2012.01) |
| *G06Q 20/40* | (2012.01) |
| *G06Q 30/08* | (2012.01) |
| *G06Q 40/04* | (2012.01) |
| *H04L 9/32* | (2006.01) |

(52) U.S. Cl.

CPC ......... *G06Q 30/08* (2013.01); *G06Q 20/0652* (2013.01); *G06Q 20/102* (2013.01); *G06Q 20/367* (2013.01); *G06Q 20/3825* (2013.01); *H04L 9/3247* (2013.01); *G06Q 2220/00* (2013.01)

(58) Field of Classification Search

CPC ............. G06Q 20/0652; G06Q 20/102; G06Q 20/3825; G06Q 30/08; G06Q 2220/00

USPC ........................................................... 705/40

See application file for complete search history.

(56) References Cited

U.S. PATENT DOCUMENTS

| | | |
|---|---|---|
| 6,422,373 B1 | 7/2002 | Yellop et al. |
| 7,204,428 B2 | 4/2007 | Wilson |

(Continued)

OTHER PUBLICATIONS

Anonymous: "1inch.io", Jan. 4, 2023, XP093135078, Retrieved from the Internet on Feb. 26, 2024: URL:http://1inch.io.

(Continued)

*Primary Examiner* — Clifford B Madamba

(74) *Attorney, Agent, or Firm* — Perkins Coie LLP

(57) ABSTRACT

Systems and methods for gasless decentralized token swaps with MEV protection are disclosed herein. A user submits to a swap platform a signed limit order to swap an amount of input token for an output token using a Dutch auction approach. The order execution price depends on time of inclusion in a block and decreases over the duration of the Dutch auction. The user does not pay a gas fee for submitting this order. The swap platform provides the order details to whitelisted resolvers to evaluate if/when/how to fill the order. Once a resolver makes that determination, it can send instructions and fill data to smart contracts of the swap platform to fill the order and implement the swap. Input tokens are pulled from the user's wallet and transferred to the resolver, in exchange for output tokens which are pulled from the resolver and transferred to the user's wallet.

14 Claims, 19 Drawing Sheets

Related U.S. Application Data

(60) Provisional application No. 63/600,819, filed on Nov. 20, 2023, provisional application No. 63/481,683, filed on Jan. 26, 2023, provisional application No. 63/479,112, filed on Jan. 9, 2023.

(56) References Cited

U.S. PATENT DOCUMENTS

| | | | |
|---|---|---|---|
| 7,537,877 | B2 | 5/2009 | Yoshiba et al. |
| 7,773,749 | B1 | 8/2010 | Durst et al. |
| 8,851,372 | B2 | 10/2014 | Zhou et al. |
| 9,239,414 | B2 | 1/2016 | Rey et al. |
| 9,269,576 | B2 | 2/2016 | Yamauchi et al. |
| 10,281,398 | B2 | 5/2019 | Zheng et al. |
| 10,412,107 | B2 | 9/2019 | Brutzkus et al. |
| 10,471,478 | B2 | 11/2019 | Gil |
| 10,603,685 | B2 | 3/2020 | Zheng et al. |
| 10,620,121 | B2 | 4/2020 | Zheng et al. |
| 10,878,108 | B1 | 12/2020 | Nicolas et al. |
| 11,123,456 | B2 | 9/2021 | Masinaei et al. |
| 11,234,567 | B2 | 2/2022 | Thorne et al. |
| 11,310,060 | B1 | 4/2022 | Poelstra et al. |
| 11,456,789 | B2 | 9/2022 | Hou et al. |
| 11,484,011 | B2 | 11/2022 | Chapman |
| 11,488,122 | B2 | 11/2022 | Diamond et al. |
| 11,544,786 | B2 * | 1/2023 | Diamond ............. H04L 9/0643 |
| 11,567,890 | B2 | 1/2023 | Bussing et al. |
| 11,678,901 | B2 | 6/2023 | Scoggins et al. |
| 11,789,012 | B2 | 10/2023 | Janes et al. |
| 11,890,123 | B2 | 2/2024 | Boone et al. |
| 12,099,978 | B2 | 9/2024 | Bukov et al. |
| 12,277,536 | B2 | 4/2025 | Dominique et al. |
| 12,423,697 | B1 | 9/2025 | Kunz et al. |
| 12,456,104 | B2 | 10/2025 | Bukov et al. |
| 2003/0120613 | A1 | 6/2003 | Neogi |
| 2003/0200439 | A1 | 10/2003 | Moskowitz |
| 2004/0112087 | A1 | 6/2004 | Bishop |
| 2008/0264043 | A1 | 10/2008 | Kawakita et al. |
| 2010/0018955 | A1 | 1/2010 | Martinez |
| 2010/0235277 | A1 | 9/2010 | Van et al. |
| 2010/0310839 | A1 | 12/2010 | Rey et al. |
| 2012/0120465 | A1 | 5/2012 | Martinez et al. |
| 2012/0167210 | A1 | 6/2012 | Oro et al. |
| 2013/0117225 | A1 | 5/2013 | Dalton |
| 2013/0157711 | A1 | 6/2013 | Lee et al. |
| 2014/0040114 | A1 | 2/2014 | Baumgart et al. |
| 2014/0289163 | A1 | 9/2014 | Michaud et al. |
| 2015/0213734 | A1 | 7/2015 | Glickman |
| 2016/0099852 | A1 | 4/2016 | Cook et al. |
| 2016/0275585 | A1 | 9/2016 | Scoggins |
| 2016/0300234 | A1 | 10/2016 | Moss-Pultz et al. |
| 2017/0358041 | A1 | 12/2017 | Forbes et al. |
| 2018/0109494 | A1 | 4/2018 | Yu et al. |
| 2018/0293474 | A1 | 10/2018 | Almog |
| 2018/0349621 | A1 | 12/2018 | Schvey et al. |
| 2018/0352033 | A1 | 12/2018 | Pacella et al. |
| 2019/0114698 | A1 | 4/2019 | Lutnick et al. |
| 2019/0130100 | A1 | 5/2019 | Dymshits et al. |
| 2019/0173666 | A1 | 6/2019 | Ardashev et al. |
| 2019/0349261 | A1 | 11/2019 | Smith et al. |
| 2019/0349733 | A1 | 11/2019 | Nolan et al. |
| 2019/0355037 | A1 | 11/2019 | Desai |
| 2019/0373521 | A1 | 12/2019 | Crawford |
| 2019/0378145 | A1 | 12/2019 | Mayer |
| 2019/0379595 | A1 | 12/2019 | Ur et al. |
| 2019/0385156 | A1 * | 12/2019 | Liu ......................... H04L 63/10 |
| 2019/0392511 | A1 | 12/2019 | Mahajan et al. |
| 2020/0076786 | A1 | 3/2020 | Spivack et al. |
| 2020/0082025 | A1 | 3/2020 | Zhou et al. |
| 2020/0104835 | A1 | 4/2020 | Day et al. |
| 2020/0119925 | A1 | 4/2020 | Wang |
| 2020/0137082 | A1 | 4/2020 | Jimenez-Delgado |
| 2020/0145454 | A1 | 5/2020 | Galliano et al. |
| 2020/0204346 | A1 | 6/2020 | Trevethan |
| 2020/0246681 | A1 | 8/2020 | Chen |
| 2020/0403776 | A1 | 12/2020 | Oh et al. |
| 2021/0027447 | A1 | 1/2021 | Parikh et al. |
| 2021/0035246 | A1 | 2/2021 | Schouppe et al. |
| 2021/0073913 | A1 | 3/2021 | Ingargiola |
| 2021/0091934 | A1 | 3/2021 | Fletcher |
| 2021/0160235 | A1 | 5/2021 | Lerner |
| 2021/0287288 | A1 | 9/2021 | Madisetti et al. |
| 2021/0352142 | A1 | 11/2021 | Jayaram et al. |
| 2021/0358004 | A1 | 11/2021 | Chang et al. |
| 2021/0390531 | A1 | 12/2021 | Voorhees et al. |
| 2022/0027970 | A1 | 1/2022 | Kim et al. |
| 2022/0126438 | A1 | 4/2022 | Cristache |
| 2022/0134547 | A1 | 5/2022 | Cristache |
| 2022/0174491 | A1 | 6/2022 | Cristache |
| 2022/0254174 | A1 | 8/2022 | Hong |
| 2022/0266451 | A1 | 8/2022 | Cristache |
| 2022/0311597 | A1 | 9/2022 | Goel |
| 2022/0341217 | A1 | 10/2022 | Cristache |
| 2023/0016065 | A1 | 1/2023 | Diamond |
| 2023/0077053 | A1 | 3/2023 | Topps |
| 2023/0086191 | A1 | 3/2023 | Jakobsson |
| 2023/0198886 | A1 | 6/2023 | Ur et al. |
| 2023/0206224 | A1 | 6/2023 | Bhos et al. |
| 2023/0206329 | A1 | 6/2023 | Cella et al. |
| 2023/0267456 | A1 * | 8/2023 | Garner ................. G06Q 20/401 705/66 |
| 2023/0385822 | A1 * | 11/2023 | Shanmugam ........ G06Q 20/381 |
| 2024/0089105 | A1 | 3/2024 | Duque et al. |
| 2024/0129108 | A1 | 4/2024 | Liu et al. |
| 2024/0193688 | A1 | 6/2024 | Nowotny et al. |
| 2024/0273486 | A1 | 8/2024 | Bukov et al. |
| 2024/0273487 | A1 | 8/2024 | Bukov et al. |
| 2024/0340354 | A1 | 10/2024 | Wakabayashi et al. |
| 2024/0420227 | A1 | 12/2024 | Bukov et al. |
| 2025/0165937 | A1 | 5/2025 | Bukov et al. |
| 2025/0211297 | A1 | 6/2025 | Gao |
| 2025/0212284 | A1 | 6/2025 | Yue et al. |
| 2025/0292252 | A1 | 9/2025 | Kunz et al. |
| 2025/0292254 | A1 | 9/2025 | Kunz et al. |
| 2025/0358109 | A1 | 11/2025 | Bukov et al. |
| 2026/0004352 | A1 | 1/2026 | Bukov et al. |

OTHER PUBLICATIONS

Fang Lucius et al.: "How to DEFI (Advanced)", May 31, 2021, pp. 1-290, XP055960691, ISBN: 9798530318443, Retrieved from the Internet on Feb. 27, 2024: URL:https://cp0x.com/applications/core/interface/file/attachment.php?id=1653&key=fca3e1489485ef25c33f83d8636fd16b.

International Search Report and Written Opinion of corresponding PCT Application No. PCT/IB2024/050223, mailed Mar. 7, 2024, ISA: EPO.

Abgaryan et al., "Dynamic Function Market Maker", arxiv.org, Jul. 25, 2023, 41 pages.

Belchior et al., "A Survey on Blockchain Interoperability: Past, Present, and Future Trends", ACM Computing Surveys, vol. 54, No. 8, 2021, pp. 1-63.

Celestino; An_attempt_at_introducing_Multipath_in_QUIC; IEEE, Univ of Napoli; pp. 352-357; 2018.

File History and the references cited therein of corresponding U.S. Appl. No. 18/439,661, filed Feb. 12, 2024, issued Oct. 28, 2025 as U.S. Pat. No. 12,456,104 B2.

File History and the references cited therein of corresponding U.S. Appl. No. 18/597,680, filed Mar. 6, 2024, issued Sep. 24, 2024 as U.S. Pat. No. 12,099,978 B2.

File History and the references cited therein of corresponding U.S. Appl. No. 18/809,084, filed Aug. 19, 2024, published May 22, 2025 as U.S. Publication No. 2025-0165937 A1.

File History and the references cited therein of corresponding U.S. Appl. No. 19/079,026, filed Mar. 13, 2025.

File History and the references cited therein of corresponding U.S. Appl. No. 19/086,741, filed Mar. 21, 2025.

File History of corresponding U.S. Appl. No. 63/484,317, filed Feb. 10, 2023.

(56)  References Cited

OTHER PUBLICATIONS

File History of corresponding U.S. Appl. No. 63/566,109, filed Mar. 15, 2024.
File History of related U.S. Appl. No. 63/636,006, filed April 18, 2024.
Gabriel; No_Plan_Survives_Contact_with_the_Enemy_On_Gains_of_Coded_Multipath_over_MPTCP; IEEE; 8 pages; 2021.
Lesavre et al., "Blockchain Networks: Token Design and Management Overview", NISTIR 8301, 2021, 84 pages.
Li; Multipath_Transmission_for_the_Internet_A_Survey; IEEE; 2016; pp. 2887-2925.
Nadkarni et al., "Adaptive Curves for Optimally Efficient Market Making", arxiv.org, Jun. 19, 2024, 25 pages.
Shi et al., "Integration of Blockchain and Auction Models: A Survey, Some Applications, and Challenges", IEEE Communications Surveys & Tutorials, vol. 25, No. 1, Nov. 28, 2022, 41 pages.
Wu; Peekaboo_Learning-Based_Multipath_Scheduling_for_Dynamic_Heterogeneous_Environments; IEEE; pp. 2995-2310; 2020.

Zaman et al., "Seamless Asset Exchange in Interconnected Metaverses: Unraveling On-Chain Atomic Swap", 2023 5th IEEE International Conference on Trust, Privacy and Security in Intelligent Systems and Applications (TPS-ISA), 2023, pp. 146-155.
Benligiray et al., "Decentralized APIs for Web 3.0", api3.org, Jan. 9, 2024, pp. 1-40.
Breidenbach et al.,"Chainlink 2.0: Next Steps in the Evolution of Decentralized Oracle Networks", Retrieved from the Internet: URL:https://research.chain.link/whitepaper-v2.pdf, Apr. 15, 2021, pp. 1-136.
Patent Application as filed of U.S. Appl. No. 18/408,376, filed Jan. 9, 2024, 81 pages.
Xu, J. et al., "SoK: Decentralized Exchanges (DEX) with Automated Market Maker (AMM) protocols" Arxiv.Org, Cornell University Library, Apr. 19, 2021, XP081930404.
Xue, Y. et al., "Invited Paper: Fault-tolerant and Expressive Cross-Chain Swaps", arxiv.org, Cornell University Library, Nov. 1, 2022, XP091357638.

* cited by examiner $$Rate = \begin{cases} MarketRate - GasForecast - OrderFee => Fast \\ MarketRate => Fair \\ MarketRate * (1 + K) => Auction \end{cases}$$

FIG. 5C

$$TakerAmount_{max} = Rate * MakerAmount$$

FIG. 5D

$$TakerAmount_{min} = Rate * MakerAmount * (1 - SlippageTolerance)$$

FIG. 5E

GASLESS DECENTRALIZED TOKEN SWAPS

CROSS-REFERENCE TO RELATED APPLICATIONS

This application is a continuation of U.S. patent application Ser. No. 18/408,376, filed Jan. 9, 2024, which claims priority to U.S. Provisional Patent Application No. 63/479,112, entitled "SYSTEMS, METHODS, AND DEVICES FOR AUTOMATIC AND DYNAMIC GASLESS DECENTRALIZED TOKEN SWAPS," filed Jan. 9, 2023; U.S. Provisional Patent Application No. 63/481,683, entitled "SYSTEMS, METHODS, AND DEVICES FOR AUTOMATIC AND DYNAMIC GASLESS DECENTRALIZED TOKEN SWAPS," filed Jan. 26, 2023; and U.S. Provisional Patent Application No. 63/600,819, entitled "GASLESS DECENTRALIZED TOKEN SWAPS," filed Nov. 20, 2023, the contents of which are incorporated by reference herein in their entirety.

Any and all applications for which a foreign or domestic priority claim is identified in the Application Data Sheet as filed with the present application are hereby incorporated by reference under 37 CFR 1.57.

TECHNICAL FIELD

The embodiments of the disclosure generally relate to gasless (e.g., fee-less) swaps of cryptocurrency tokens. The embodiments of the disclosure also generally relate to decentralized swaps of cryptocurrency tokens (e.g., peer-to-peer transactions implemented via smart contracts of a distributed blockchain network rather than through a centralized intermediary that takes possession of the tokens).

BACKGROUND

Users often perform swaps of blockchain-based cryptocurrency tokens, in which an amount of an input token is exchanged for an amount of an output token. Such swaps can be performed over centralized exchanges and decentralized exchanges, the latter of which are gaining in popularity. These swaps typically require that the user pay transaction fees to incentivize nodes of the blockchain network to process the transaction. These transaction fees are sometimes referred to as gas fees.

However, users are often required to pay gas fees in a specific form, such as the native token of the blockchain network that the transaction is occurring on. Furthermore, the exact gas fees for a transaction are not known in advance. This is quite inconvenient because it requires that users hold onto sufficient tokens of a specific form or maintain a separate gas balance to execute a swap. Users that regularly execute transactions across many different networks would need to hold many different tokens to cover the gas fees.

Additionally, the execution of swaps over decentralized exchanges has given rise to another significant issue: maximal extractable value (MEV). Savvy and technologically advanced participants of decentralized exchanges can conduct MEV attacks to obtain profit, such as by frontrunning large transactions. A user seeking to execute a large transaction over a decentralized exchange can lose a substantial fraction of the total transaction amount to MEV attacks, beyond what would typically be tolerated as slippage. Accordingly, there exists a need for a swap platform and/or swap approach that allows users to perform gasless decentralized token swaps while being protected against potential MEV attacks.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

Systems and methods for gasless decentralized token swaps with MEV protection are disclosed herein. A user submits to a swap platform, via a frontend application, a signed limit order to swap an amount of input token for an output token using a Dutch auction approach. The order execution price depends on time of inclusion in a block and decreases over the duration of the Dutch auction. The user does not pay a gas fee for submitting this order. The swap platform provides the order details to whitelisted resolvers to evaluate if/when/how to fill the order. Once a resolver makes that determination, it can send instructions and fill data to smart contracts of the swap platform to fill the order and implement the swap. Accordingly, the resolver pays the gas fee of the user for executing the transaction onchain. The smart contracts of the swap platform and/or the smart contracts of the resolver may interoperate to pull input tokens from the user's wallet and transfer them to the resolver, in exchange for output tokens which are pulled from the resolver and transferred to the user's wallet.

The user may be able to configure various parameters of the order, such as the input token, the amount of input token to swap, the output token, and so forth. In some embodiments, a current market swap rate and estimates associated with the order may be generated by a backend quoter service of the swap platform and provided to the user during order configuration. In some embodiments, the quoter service may generate a grid curve that indicates how the execution price of the order decreases over the duration of the Dutch auction.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIGS. 5C-5E shows schematics of equations for calculating the plurality of swap thresholds of FIG. 5B, in accordance with embodiments described herein.

FIG. 7 is a schematic of a method of performing batch token swaps according to embodiments herein.

DETAILED DESCRIPTION

Figure 1:
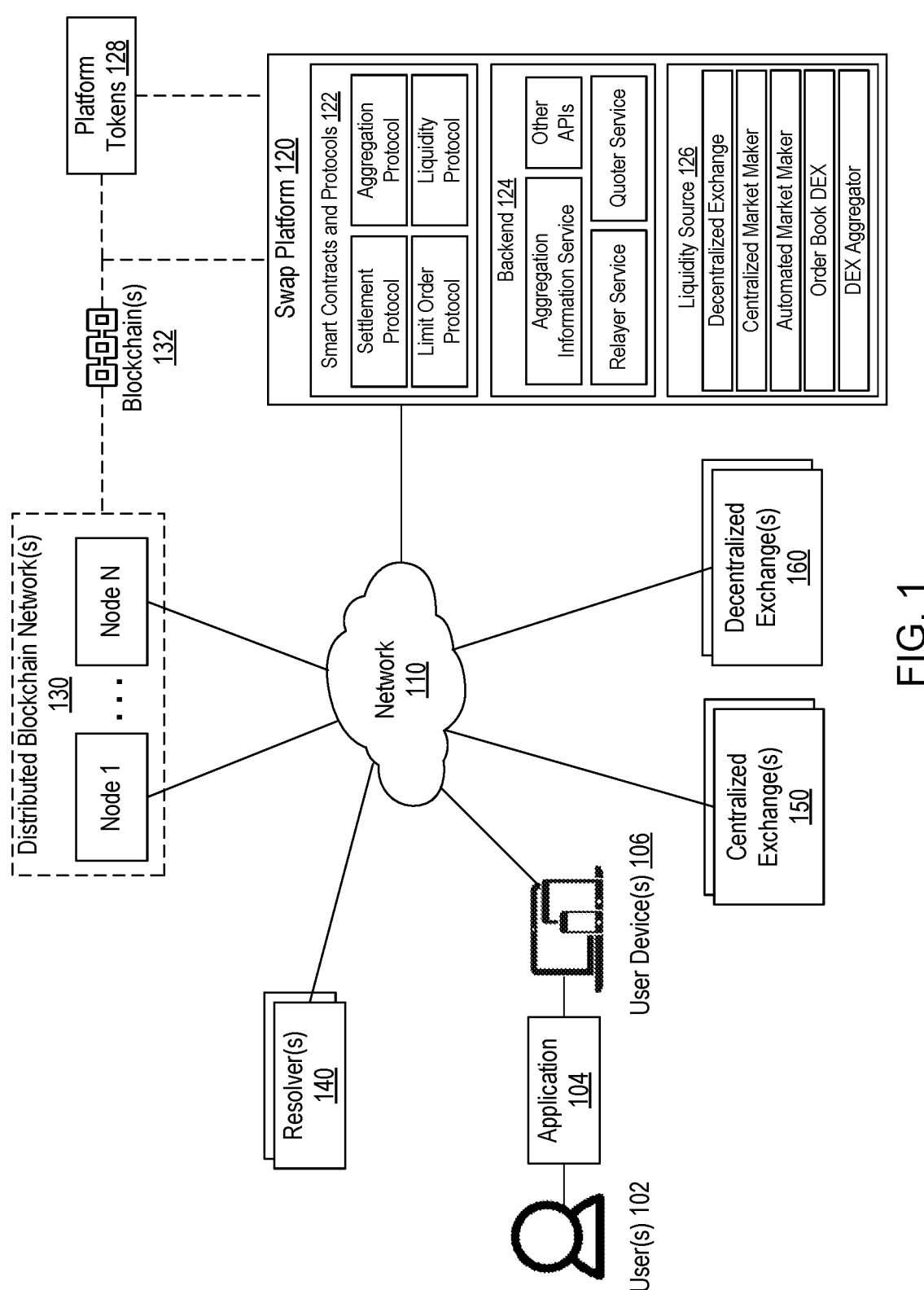
FIG. 1 illustrates a system diagram comprising a swap platform that can be used to implement gasless decentralized token swaps with MEV protection, in accordance with embodiments disclosed herein.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

"Gas" is a term of art that is often used to refer to a transaction fee for compensating miners/validators of a Ethereum Virtual Machine (EVM) compatible blockchain network in exchange for their computational effort of mining and processing blocks on the blockchain. However, the inventions disclosed herein may be applicable to other blockchain networks and implementations. Accordingly, the term "gas" may also broadly refer to any fee that enables users to conduct transactions or execute contracts on a blockchain network or to any fee that could incentivize an entity or participant to process transactions on a blockchain.

The terms "users," "makers," and "swappers," are used synonymously herein to refer to any person that utilizes the swap platform by submitting a token swap order to the swap platform.

The terms "resolvers," "takers," "fillers," and "market makers" are used synonymously herein to refer to a third party or entity that fills swap orders submitted by users (e.g., as a counterparty) via the swap platform or it may refer to the collection of applications employed by such a third party or entity. Examples of such entities may include MEV searchers, market makers, onchain agents, and so forth, who collectively compete to fill orders submitted by users. In the latter sense, the term "resolver" could also be used to refer to a set of onchain and offchain applications, which are components in an architecture that is developed by a third party or entity for use with a swap platform to fill swap orders.

The terms "input token," "source token," and "maker token" are used synonymously to refer to the type of token that is in a user's wallet, which the user is seeking to exchange for a different type of token via a token swap order submitted to the swap platform.

The terms "output token," "destination token," and "taker token" are used synonymously to refer to the type of token that the user is seeking to exchange for via a token swap order submitted to the swap platform. The output token may be transferred from a resolver to the user's wallet.

As used herein, the term "limit order" may refer to a Dutch auction limit order with a dynamic limit price that is implemented on the settlement contract instead of a limit order as understood in classical finance. The execution price of such a limit order may decrease over a duration of a Dutch auction.

As previously discussed, there are numerous problems and issues encountered when swapping between cryptocurrency tokens of different blockchains-especially when the swap occurs on a decentralized exchange. One such problem is maximal extractable value (MEV) attacks, which pose a highly technical problem specific to blockchain-based crypto assets. MEV is the value extracted by block builders (e.g., miners or validators, in the case of Proof-of-Stake consensus protocols) by utilizing their ability to order transactions within a block. More specifically, MEV is earned primarily by miners through their ability to reorder transactions within blocks and represents a third form of miner revenue beyond the block subsidy (new issuance) and transaction fees that the miners are typically expected to earn in the normal course of mining. Miners benefit from "priority" fees that users of the blockchain are willing to pay in order to speed up their transactions.

MEV attacks refer to a new breed of high frequency trading being conducted by savvy and technologically advanced participants to generate tidy profits at the direct expense of other participants. There are three common categories of MEV scenarios: front-running, back-running, and sandwich attacks. In all three cases, sophisticated users (e.g., an attacker) can use automated bots to scan and monitor the mempool, the node's holding area for submitted and unconfirmed transactions before they are added to a block. The mempool is scanned to identify pending transactions, especially large ones that can potentially move market prices for the crypto asset and create profitable arbitrage opportunities.

In the case of front-running, the attacker will check to see if it would be lucrative to execute their own transaction before the identified transaction (e.g., buy in advance of an identified buy order, then turn around and sell at higher prices) by running the identified transaction locally. If the result is favorable, then the attacker can pay a higher gas price (e.g., an extra fee) in order to jump their transaction in front of the identified transaction in the queue to be filled, so that their own transaction will be earlier in the block. The attacker's front-running order impacts the prices of the swapped assets and the fills received by the victim, resulting in the attacker making a profit at the expense of the victim, who ends up receiving a lower amount of the target token than expected.

In the case of back-running, the attacker will similarly seek to identify a pending large transaction. However, the attacker instead inserts their own transaction to be executed immediately after the identified target transaction, in order to make a profit from the market fluctuations that will be generated by the identified transaction.

In the case of sandwich attacks, the attacker will combine front-running and back-running by placing orders for execution right before and right after an identified price-changing transaction. For example, the attacker may front-run an identified price-changing transaction (e.g., a victim's large buy order) with a first transaction (e.g., the attacker's own buy order) and back-run the identified transaction with a second transaction (e.g., the attacker's sell order). The attacker's buy order would be executed first and removes liquidity available at current prices, likely resulting in the victim's transaction being executed at higher, less favorable prices. The attacker's sell order then immediately sells (e.g., the assets acquired from the attacker's buy order) at the higher price, capturing the price difference caused by the victim's large buy order and leaving the victim's transaction front-run and back-run as if in a sandwich.

A user seeking to execute a large transaction can lose a substantial fraction of the total transaction amount to MEV attacks, beyond what would typically be tolerated as slippage. For example, a user seeking to acquire an asset may find that their trade settled at a much higher price than expected. MEV has grown to become especially lucrative on the Ethereum network due to the rise of Decentralized Finance (DeFi) applications and other tools that have enabled MEV to become easier to earn and find opportunities. Many blockchains have looked into solutions for reducing the number of participants able to profit from MEV.

Another problem often encountered when swapping between cryptocurrency tokens is that the user must pay gas (e.g., transaction fees) to perform a swap transaction (e.g., swap one token for another token). More specifically, the problem is that a user must pay gas fees in the form of native tokens of the blockchain network that the transaction is taking place on, which requires that users hold onto native tokens or maintain a separate gas balance to execute a transaction or perform a swap. Users that regularly execute transactions across many different networks would need to hold all the various native tokens of those networks. This is both extremely inconvenient and inefficient.

Furthermore, the gas fee for a transaction is not fixed and cannot be pinned down in advance, making it impossible to calculate the exact amount of gas needed before the transaction has been executed. The size of this gas fee is proportional to the amount of computation required to execute an operation (not the amount of tokens swapped). The more complex the operation is, the more gas it requires to execute. During periods of high network congestion, gas fees can skyrocket. For example, as the Ethereum network and its market value grows in size, so do the gas fees required for transactions. At times, Ethereum fees can be very high and significantly impact the profitability of trades/ swaps. Unpredictability and volatility in gas fees can turn off users, discourage participation, and limit the transactions that would otherwise occur.

Aspects of the inventions disclosed herein involve specific implementations for addressing these problems. For instance, the inventions disclosed herein mitigate and prevent MEV attacks by internalizing orders within the swap platform (e.g., offchain), which reduces the risk of a user being front-run or sandwiched. Furthermore, the inventions disclosed herein enable users to conduct "gasless" swaps, which are not "gasless" in the sense that there are no gas fees involved at all to execute a transaction, but rather that the transaction is "gasless" from the perspective of the user issuing the swap order. For example, instead of the user paying the gas fee for a submitted swap order, a resolver may pay 100% of the gas fees when filling the swap order. This allows users to swap at a competitive rate without needing excessive reserves of native tokens for gas fees.

The inventions disclosed herein also provide other practical and technological benefits, such as provide price improvement on user submitted orders, especially large transactions. Other improvements and benefits experienced by users include no price impact, no cost for failed transactions, and fast execution. Other improvements and benefits experienced by resolvers include the ability to earn staking rewards, earn resolver fees, participate in a "gas refund program," and earning DAO governance voting power.

FIG. 1 illustrates a system diagram comprising a swap platform that can be used to implement gasless decentralized token swaps with MEV protection, in accordance with embodiments disclosed herein.

For the purpose of facilitating understanding, components of the system are described in the singular whenever possible. However, it should be understood that, as implied by the figure, there can be multiple users 102 (each of which may have multiple corresponding user devices 106), multiple resolvers 140, multiple nodes (e.g., nodes 1 through N) in the distributed blockchain network 130, multiple centralized exchanges 150, and multiple decentralized exchanges 160.

Also for the purpose of facilitating understanding, aspects of the system may have been simplified or combined in the figure. For example, the resolver 140 is shown as a single block. However, in practice, a resolver 140 may not be a monolithic component of the system, but instead it could have multiple components that are spread across physical and virtual space. For example, a resolver 140 could comprise one or more offchain applications and one or more onchain applications (e.g., smart contracts), such as a set of onchain and offchain applications that are developed by a third party company. Thus, it should also be understood that aspects of the system may be configured, arranged, or distributed differently than what is represented in the figure.

In some embodiments, there may be one or more user devices 106, one or more resolvers 140, one or more nodes of one or more distributed blockchain networks 130, one or more centralized exchanges 150, one or more decentralized exchanges 160, and a swap platform 120 that are interconnected and in electronic communication through a network 110 (e.g., the Internet).

In some embodiments, there may be an application 104 that is accessible on a user device 106. The user 102 may be able to access and interact with the application 104 in order to initiate token swaps through the swap platform 120. The application 104 may provide a user interface through which the user 102 may be able to submit swap requests. Some non-limiting examples of the user device 106 may include a mobile phone, a smartphone, a laptop, a desktop, a tablet, and/or any other personal computing device.

In some embodiments, the application 104 may be installed and then executed on the user device 106, as is often the case with software applications or mobile applications. In some embodiments, the application 104 may be a web-based application that can be accessed by the user device 106 (e.g., via a browser). In some embodiments, the application 104 may serve as a frontend to a corresponding backend for implementing token swaps, such as the backend 124 of the swap platform 120. In some embodiments, the application 104 may serve as a frontend for a decentralized application (dApp), which is a digital application or program that runs on a decentralized network rather than a single computer or server. dApps are often built on blockchain technology and use cryptocurrency as a means of exchange.

In some embodiments, there may be a distributed blockchain network 130 operating on a plurality of nodes (e.g., nodes 1 through N). The distributed blockchain network 130 may be a peer-to-peer (P2P) computer network that manages and maintains a blockchain 132, which is a public distributed ledger with growing lists of transaction records (blocks) that are securely linked together via cryptographic hashes. The nodes of the distributed blockchain network 130 may collectively adhere to a consensus algorithm protocol to add and validate new transaction blocks to the blockchain 132. The execution of transactions on the blockchain 132 may involve a cryptocurrency or token, which operates as a decentralized medium of exchange within the distributed blockchain network 130. The blockchain 132 may also allow for smart contracts (e.g., scripts or programs) that are stored on the blockchain 132 and that can be partially or fully executed without human interaction when predetermined conditions are met. An example of the distributed blockchain network 130 may be the Ethereum network, and an example of the blockchain 132 may be the Ethereum blockchain.

In some embodiments, there may be one or more centralized exchanges (CEXes) 150. A centralized exchange 150 may be an online platform used to buy and sell cryptocurrencies. More specifically, a centralized exchange 150 may be an online platform operated by an intermediary or third party that is entrusted with handling the assets of buyers and sellers to help facilitate/conduct cryptocurrency transactions between those buyers and sellers.

In some embodiments, there may be one or more decentralized exchanges (DEXes) 160. A decentralized exchange 160 may be an online platform that allows the peer-to-peer exchange of cryptocurrencies without an intermediary or third party to validate or process the transaction. The decentralized exchange 160 may use smart contract and atomic swap (e.g., cross-chain swaps) technology to implement automated, self-enforcing cryptocurrency exchange contracts for executing these peer-to-peer transactions.

In some embodiments, there may be a swap platform 120 that enables gasless decentralized token swaps with MEV protection, as disclosed herein. In some embodiments, the swap platform 120 may be a decentralized finance (DeFi) platform. The swap platform 120 or some of its components may be implemented across the blockchain 132 and the nodes of the distributed blockchain network 130 instead of being stand-alone (e.g., operated on a separate backend server), For example, the swap platform 120 may comprise smart contracts and protocols 122, which consist of autonomous code or programs that are integrated into the blockchain 132 and hosted on the nodes of the distributed blockchain network 130. These smart contracts and protocols 122 may enable gasless swaps, provide protection from frontrunning and sandwiching attacks, and enhance the speed of order executions.

The figure only illustrates some examples of the smart contracts and protocols 122 used by the swap platform 120 and is not meant to be an exhaustive reference. One example of the smart contracts and protocols 122 used by the swap platform 120 may be a settlement protocol. The settlement protocol may be an intermediary set of smart contracts that are used by the resolvers 140 to execute and fill swap orders.

Another example of the smart contracts and protocols 122 used by the swap platform 120 may be an aggregation protocol. In some embodiments, the aggregation protocol may be a discovery and routing algorithm, which offers asset exchanges at the best rates on the market. The aggregation protocol may be able to find the most efficient paths for a token swap, and it may be able to split between different protocols and even different market depths within one protocol in the shortest possible time. In other words, the aggregation protocol may source liquidity from various exchanges and be capable of splitting a single trade transaction across multiple DEXes to ensure the best rates. Additional information about the aggregation protocol is described in U.S. Provisional Application No. 63/484,317, filed on Feb. 10, 2023 and entitled "SYSTEMS, METHODS, AND DEVICES FOR DYNAMIC MULTI-PATH TRANSFERS," the contents of which are hereby incorporated by reference in its entirety. In some embodiments, the aggregation protocol may be used in various aggregation information services, such as 1inch Pathfinder implemented on the 1inch network.

Another example of the smart contracts and protocols 122 used by the swap platform 120 may be a liquidity protocol. In some embodiments, the liquidity protocol may be an automated market maker (AMM) that aims to offer capital-efficient liquidity positions while protecting users from front-running.

Another example of the smart contracts and protocols 122 used by the swap platform 120 may be a limit order protocol. In some embodiments, the limit order protocol may be a set of smart contracts that allows users to place limit orders and RFQ orders, which later can be filled on-chain. Both types of orders are a data structure created off-chain and signed according to EIP-712. The limit order protocol may enable gasless limit orders, and it may provide benefits such as extreme flexibility and high gas efficiency.

In some embodiments, the smart contracts and protocols 122 may include a staking contract (not shown). In particular, the swap platform 120 may be associated with its own swap platform tokens 128 ("platform tokens"). In some embodiments, any user of the swap platform 120 (including resolvers 140) may be able to stake/lock their platform tokens 128 via a staking contract over the duration of a lock period, in exchange for "voting power" that may be used in various scenarios. In some embodiments, the platform tokens 128 may be an ERC-20 token that is used to participate in the swap platform's DAO governance process.

In some embodiments, the lock period could be any time between 1 day and 4 years. In some embodiments, the longer the lock period, the more voting power a user may receive on their staked platform tokens. For example, a 4 year lock period may result in 1 voting power being given to a user for each platform token staked, a 3 year lock period may result in 0.5623 voting power being given to a user for each platform token staked, a 2 year lock period may result in 0.3162 voting power being given to a user for each platform token staked, a 1 year lock period may result in 0.1778 voting power being given to a user for each platform token staked.

In some embodiments, users may be able to use their voting power with a delegation system that provides users with a series of delegation contracts, each of which is associated with a specific topic for delegation. Examples of topics may include governance voting and gasless-swap resolving. In some embodiments, each topic may be project specific and independent from all other topics, which allows differentiation between different entities based on their area of responsibility. Users may be able to independently delegate their staked platform tokens and voting power to different entities in different areas according to their own personal preferences.

In some embodiments, the swap platform 120 may comprise a backend 124 (e.g., for the application 104) and backend services. The figure only illustrates some examples of the components and services associated with the backend 124 and is not meant to be an exhaustive reference. For example, there can be various application programming interfaces (APIs) that enable communication and interaction with the swap platform 120. As another example, there can be an aggregation information service, which leverages the aggregation protocol to find the most efficient paths for a token swap. As another example, there can be a relayer service for transmitting orders to the resolvers 140 to act on. As another example, there can be a quoter service for estimating the results of orders submitted to the swap platform 120 and generating grid curves.

In some embodiments, the swap platform 120 may include logic for one or more liquidity source(s) 126, examples of which include a decentralized exchange, a centralized market maker, an automated market maker, order book DEX, and DEX aggregator. In some embodiments, the liquidity source 126 may utilize some of the components and mechanisms of the swap platform, such as the various smart contracts and protocols 122, to perform transactions such as token swaps.

In some embodiments, the resolvers 140 are entities, private market makers (PMMs) or other persons, who compete in attempts to fill and execute the orders submitted by the users. Thus, any person or entity may become a resolver 140, provided that certain requirements are met. In some embodiments, resolvers 140 may need to be whitelisted to be able to participate in filling user orders through the swap platform 120. In some embodiments, resolvers 140 may need to stake platform tokens 128 to be put on the whitelist. The stake may determine a resolver's ability to get orders and ensures that a resolver follows the protocol rules (like in a proof of stake model). In some embodiments, to be put on the whitelist, the resolvers 140 may be required to stake an amount of platform tokens 128 for any lock period to have enough voting power to get into the top N stakers (e.g., N=10). To meet this requirement, a resolver 140 may itself possess and stake that amount of platform tokens, or the resolver 140 may be able to attract users that will delegate to the resolver 140 their staked platform tokens or voting power in exchange for rewards.

Accordingly, one of the requirements to become a resolver 140 may be that an entity may need to stake enough platform tokens to obtain sufficient voting power. Other requirements for becoming a resolver 140 may include having an entity register as a resolver 140 via a smart contract of the swap platform 120. Other requirements for becoming a resolver 140 may include having an entity deposit enough assets into an account (e.g., USDC to FeeBank) that will enable the entity to cover the gas fees and other resolving fees associated with executing transactions. Other requirements for becoming a resolver 140 may include having an entity go through a verification process such as KYC/KYB, including wallet/account screening to ensure that the account of the entity is not related to any illicit activities.

Figure 2A:
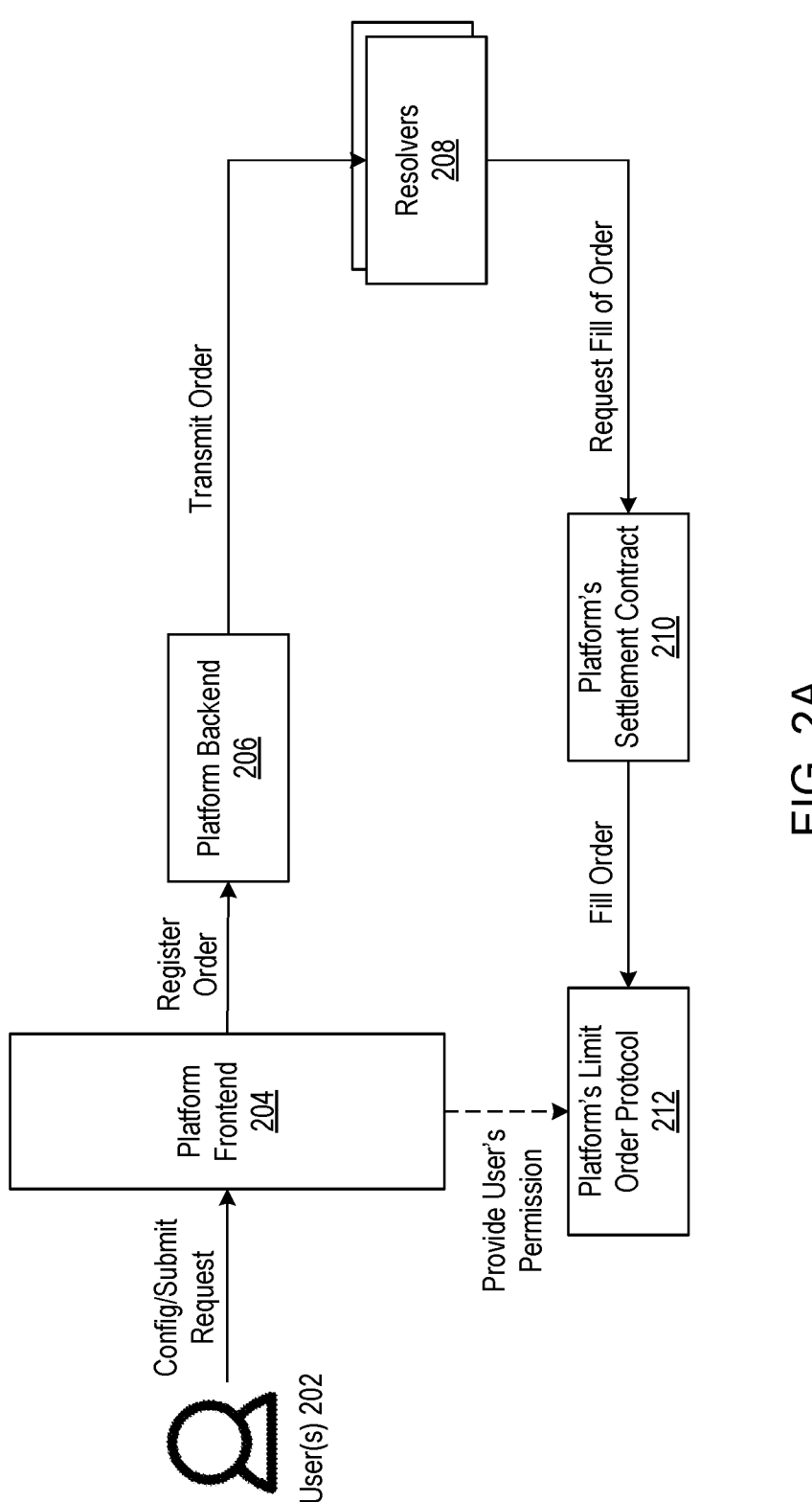
FIG. 2A is a flow diagram that illustrates a simplified overview of the process for a gasless decentralized token swap, in accordance with embodiments described herein.

FIG. 2A is a flow diagram that illustrates a simplified overview of the process for a gasless decentralized token swap, in accordance with embodiments described herein.

A user 202 may enter and configure parameters for a swap order request through a frontend 204 of a swap platform (e.g., the swap platform 120 shown in FIG. 1). More specifically, the user 202 may create a request for a limit order for a token swap using the frontend 204, with the order swapping an input token (a "maker" token) for an output token (a "taker" token). The user 202 may be able to adjust and set swap parameters for the limit order using a user interface within the frontend 204. For example, the user 202 may be able to set the parameters that determine the rate and speed of execution, with the higher the rate the longer the execution time. The user 202 may then submit the order request within the frontend 204, which will send the order request to the swap platform's backend 206, which will register the order.

In some embodiments, the user 202 may provide permission or authority for the swap platform to move the specified funds from the user's wallet and perform the swap. For example, the frontend 204 may request that the user 202 provides permission for the swap platform to perform the swap request, and the permission can be forwarded to platform's limit order protocol 212. As another example, the order itself may provide permission for the swap platform (e.g., a smart contract or protocol, such as a limit order protocol 212) to swap an amount of input tokens specified in the order. For instance, the order may be digitally signed by the user 202 (e.g., in accordance with the EIP-712 standard) to approve a swap for a specified amount of input tokens and provide permissions for the limit order protocol 212 to perform the swap. The frontend 204 may provide the user's signature to the limit order protocol 212. In some embodiments, the user's approval or signature may be stored off-chain via the limit order protocol 212 and not require any gas fees.

In some embodiments, after the user 202 submits a swap order request, a complex sequence of actions may be executed to resolve the swap-first offchain, then onchain. In the offchain phase, the backend 206 may register the user's order. There may be a set of resolvers 208 that are whitelisted on the swap platform, and the backend 206 may transmit the order to the whitelisted resolvers 208 of the platform.

Each of the whitelisted resolvers 208 may have their own algorithms and logic for determining whether to fill the user's order (e.g., as a counterparty for the swap) and how to fill the user's order. A resolver could choose not to fill the order. Accordingly, not every available whitelisted resolver will be a counterparty for the swap. A resolver may also choose to fill part of the user's order. Accordingly, there could be multiple resolvers that are counterparties to the swap, with each of those resolvers filling a part of the user's order.

Any resolvers 208 that decide to fill the user's order may request order filling with the settlement contract 210. In some embodiments, any resolvers 208 that are on a whitelist can fill the order. In some embodiments, submission of instructions to the settlement contract 210 may conclude the offchain phase and initiate the onchain phase for resolving the swap.

After receiving order fill instructions from a resolver 208, the settlement contract 210 may check to see if a requesting resolver 208 is whitelisted and then fill the order with the use of the limit order protocol 212. The resolvers 208 that request order filling with the settlement contract 210 are effectively the initiators/submitters of the transaction and pay any gas fees for adding the transaction to the blockchain, and the resolvers 208 may have to take these gas fees into consideration when deciding whether to fill the user's order. Accordingly, the user 202 would not be on the hook for paying any gas fees associated with the transaction.

To execute filling of the order, [the settlement contract 210 may call the limit order protocol 212 to fill the order. The limit order protocol 212 may do so by retrieving the input token for the swap from the user's wallet (using the user's permission/approval provided earlier) to transfer to the account of the resolver 208. In some embodiments, the settlement contract 210 and/or limit order protocol 212 may also be able to retrieve the output token for the swap from the account of the resolver 208 and transfer it to the user's wallet.

In some embodiments (not shown), there may not be a separate settlement contract 210. In some of such embodiments, the limit order protocol 212 may include a settlement extension that will receive the fill request from the resolver 208. Accordingly, any of the described functions of the settlement contract 210 may be performed by the limit order protocol 212.

Figure 2B:
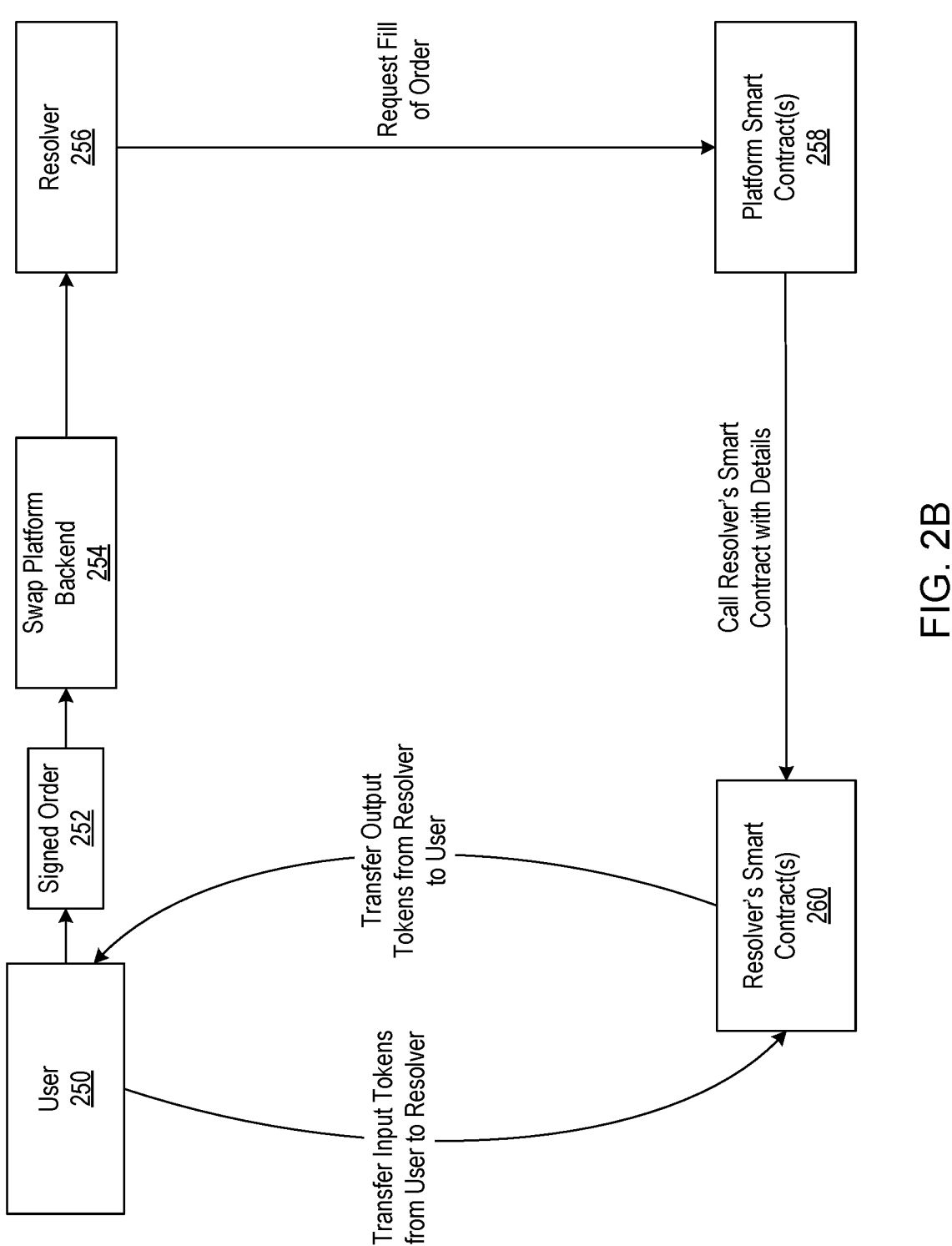
FIG. 2B is a flow diagram that illustrates a simplified overview of the process for a gasless decentralized token swap, in accordance with embodiments described herein.

FIG. 2B is a flow diagram that illustrates a simplified overview of the process for a gasless decentralized token swap, in accordance with embodiments described herein.

In some embodiments, a user 250 may configure a limit order for a token swap (e.g., using a frontend for a swap platform available on their user device). The user 250 may be able to set and adjust parameters for the order within the user interface of the frontend. In some embodiments, the order may be executed based on a Dutch auction approach, and parameters for the Dutch auction may be configurable within the user interface. Unlike ordinary limit orders, the limit order may execute at a price that depends on the time of its inclusion in a block. More specifically, the execution price may decrease over the duration of a Dutch auction. In some embodiments, the Dutch auction starts at a price that is estimated to be better for the user 250 than the current estimated market price. The order's execution price then decays over time until it hits the worst price the user 250 would be willing to accept (e.g. a minimum amount of output token). Resolvers may be incentivized to fill such a limit order as soon as it is profitable for them to do so, since they risk losing the order to another resolver willing to take a smaller profit.

In some embodiments, the set of parameters for an order that the user 250 may be able to set may include an input token, an amount of the input token (e.g., to swap), an output token, a starting amount of output token (e.g., a maximum amount of output token, at which a Dutch auction may start at), a minimum amount of output token to be received, and/or a time threshold or time window (e.g., associated with the execution approach, such as a duration or deadline for the Dutch auction). In some embodiments, the set of parameters for an order that the user 250 may be able to set may include parameters associated with swap rate (the time of order's execution may correlate with the swap rate, with a higher rate correlating to a longer execution time) and/or and any presets for the execution approach (e.g., "Fast," "Fair," "Auction"). In some embodiments, a grid curve may be generated (e.g., by a quoter service) to be included with the order, which may specify how the auction price may decay over the duration of the auction (e.g., from the maximum amount of output token to the minimum amount of output token).

Once the user 250 has finished configuring the order, the user 250 may submit the order through the frontend to the swap platform's backend 254 to be picked up by various resolvers, including resolver 256. In some embodiments, the user 250 may also be requested to provide the approvals to the protocol to move the user's tokens. For example, in some embodiments, the swap platform may utilize a smart contract with token approval functionality that enables the user to grant the protocol approval to move tokens from the user to the resolver. The smart contract can be any smart contract having a token approval function for verifying the user's authorization before performing a token transfer. Non-limiting examples of such smart contracts may include Permit and Permit2, a token approval contract that uses signature-based approvals and transfers for any ERC20 token. Accordingly, the user 250 may have to sign the order before an actual swap or transaction can be performed. In some cases, the user may first be required to approve the smart contract before submitting a signed order.

Thus, a signed order 252 may be provided to the swap platform backend 254. The signed order 252 may include the configured parameters for the order, such as the input token, the input token amount, the output token, the starting/ maximum output amount, the minimum output token amount, the time threshold or deadline for a Dutch auction, and so forth. The signed order 252 may include the generated grid curve that serves as a decay function, specifying how the auction price may decay over the duration of the auction (e.g., from the maximum amount of output token to the minimum amount of output token). The signed order 252 may include permission or authorization for the swap platform to move the user's tokens, which can be in the form of a signature-based approval (e.g., a digital signature of the user 250) associated with token approval functionality.

The swap platform backend 254 may provide this order information to a resolver 256 to evaluate. The resolver 256 may be able to determine if and how to fill the order (e.g., as a counterparty to the user 250). In some embodiments, a backend of the resolver 256 (e.g., an application or program) may automatically make the determination to determine if and how to fill the order without needing additional human intervention. The resolver backend may have logic for deciding which orders to fill and when to fill the order (e.g., at which block). Each resolver may employ their own logic to enable their transactions to be profitable. The swap platform does not mandate how the resolver 256 fills the order, and the resolver 256 is free to source liquidity from onchain liquidity venues like a DEX, offchain liquidity, or by pairing up the order with a complementary order (described in regards to FIG. 8).

Once the resolver 256 has decided if and when to fill the order, the resolver 256 may request fill of the order through one or more smart contracts 258 of the swap platform, which initiates the onchain phase of executing the swap order. The resolver 256 may provide instructions and fill data to the one or more smart contracts 258, and the one or more smart contracts 258 may settle and implement execution of the swap. The one or more smart contracts 258 of the swap platform may include a settlement protocol, a limit order protocol, an aggregation protocol, and/or a router protocol with limit order protocol functionality, as described herein.

Accordingly, the resolver 256 is submitting the signed order 252 of the user 250 onchain, which means the resolver 256 will have to pay gas fees on behalf of the user 250. The resolver 256 may recoup these costs by factoring in these gas fees into the execution price and its decision regarding if/when to fill the order. In some embodiments, the resolver 256 may be able to bundle multiple orders into the same transaction, which is described in more detail in connection with FIG. 8A, FIG. 8B, and FIG. 10.

In some embodiments, the one or more smart contracts 258 of the swap platform may call one or more smart contracts 260 of the resolver 256 to actually resolve the swap order using details of the swap. The one or more smart contracts 260 of the resolver 256 may include a resolver implementation contract, a resolver worker contract, and/or a resolver backend, as described herein. To resolve the order, the one or more smart contracts 260 of the resolver 256 may transfer input tokens from a wallet of the user 250 to an account of the resolver 256. The one or more smart contracts 260 of the platform may also transfer output tokens from the account of the resolver 256 to the wallet of the user 250.

In some embodiments, the smart contracts 258 of the swap platform may oversee settlement and execution of the swap. The smart contracts 258 may check or verify execution of the swap to ensure the swap order's conditions have been met or that the swap matches the parameters set by the user 250 (e.g., the amount of input tokens transferred from the user's wallet and the amount of output tokens transferred to the user's wallet). In some embodiments, the smart contracts 258 may be able to revert a swap that does not match the parameters set by the user 250.

Figure 2C:
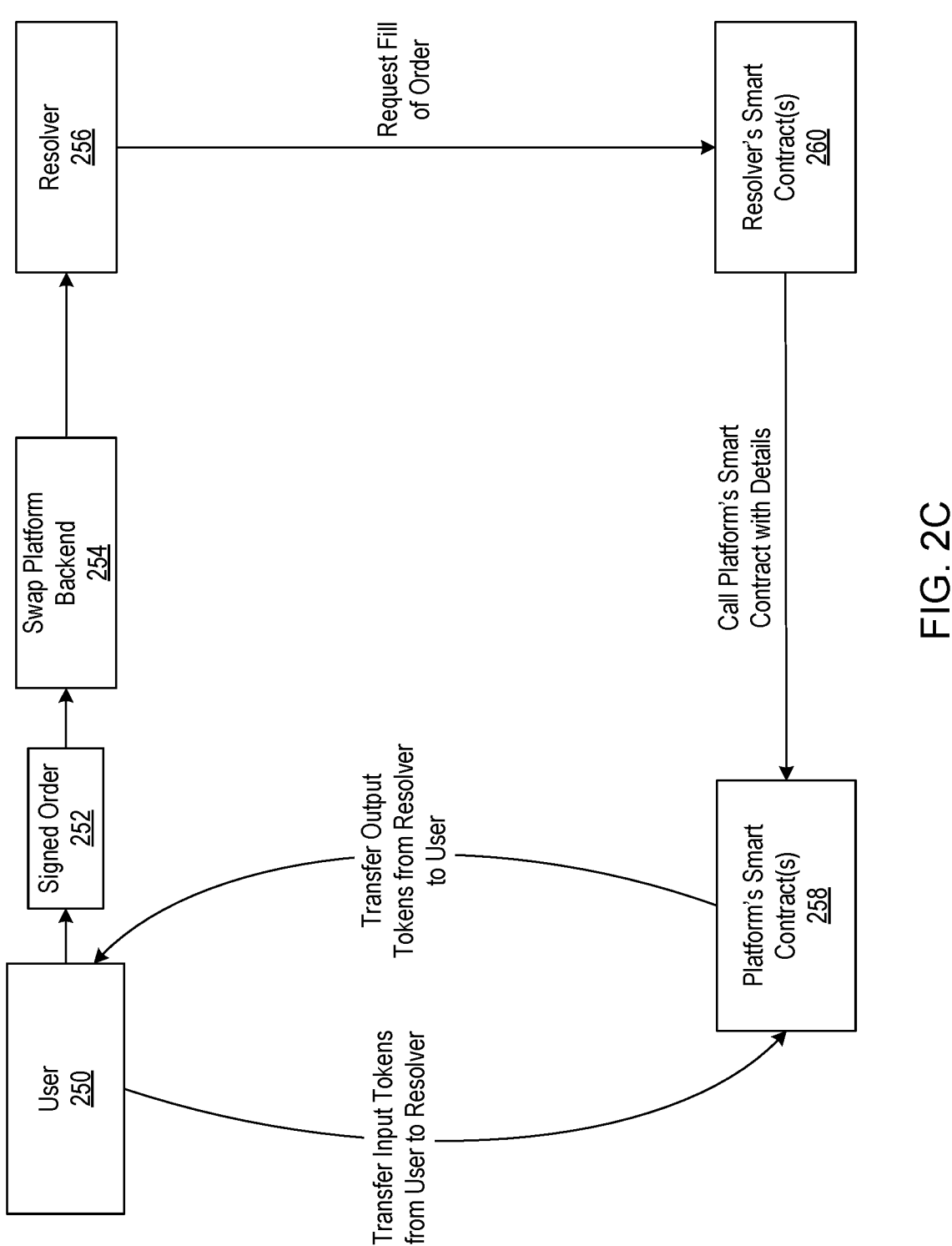
FIG. 2C is a flow diagram that illustrates a simplified overview of the process for a gasless decentralized token swap, in accordance with embodiments described herein.

FIG. 2C is a flow diagram that illustrates a simplified overview of the process for a gasless decentralized token swap, in accordance with embodiments described herein.

More specifically, FIG. 2C is similar to FIG. 2B, but instead of the resolver's smart contract 260 sending tokens to or receiving tokens from the user wallet 810, the platform's smart contract 258 performs those functions instead.

In some embodiments, a user 250 may configure a limit order for a token swap (e.g., using a frontend for a swap platform available on their user device). The user 250 may be able to set and adjust parameters for the order within the user interface of the frontend. In some embodiments, the order may be executed based on a Dutch auction approach, and parameters for the Dutch auction may be configurable within the user interface. Unlike ordinary limit orders, the limit order may execute at a price that depends on the time of its inclusion in a block. More specifically, the execution price may decrease over the duration of a Dutch auction. In some embodiments, the Dutch auction starts at a price that is estimated to be better for the user 250 than the current estimated market price. The order's execution price then decays over time until it hits the worst price the user 250 would be willing to accept (e.g. a minimum amount of output token). Resolvers may be incentivized to fill such a limit order as soon as it is profitable for them to do so, since they risk losing the order to another resolver willing to take a smaller profit.

In some embodiments, the set of parameters for an order that the user 250 may be able to set may include an input token, an amount of the input token (e.g., to swap), an output token, a starting amount of output token (e.g., a maximum amount of output token, at which a Dutch auction may start at), a minimum amount of output token to be received, and/or a time threshold or time window (e.g., associated with the execution approach, such as a duration or deadline for the Dutch auction). In some embodiments, the set of parameters for an order that the user 250 may be able to set may include parameters associated with swap rate (the time of order's execution may correlate with the swap rate, with a higher rate correlating to a longer execution time) and/or and any presets for the execution approach (e.g., "Fast," "Fair," "Auction"). In some embodiments, a grid curve may be generated (e.g., by a quoter service) to be included with the order, which may specify how the auction price may decay over the duration of the auction (e.g., from the maximum amount of output token to the minimum amount of output token).

Once the user 250 has finished configuring the order, the user 250 may submit the order through the frontend to the swap platform's backend 254 to be picked up by various resolvers, including resolver 256. In some embodiments, the user 250 may also be requested to provide the approvals to the protocol to move the user's tokens. For example, in some embodiments, the swap platform may utilize a smart contract with token approval functionality that enables the user to grant the protocol approval to move tokens from the user to the resolver. The smart contract can be any smart contract having a token approval function for verifying the user's authorization before performing a token transfer. Non-limiting examples of such smart contracts may include Permit and Permit2, a token approval contract that uses signature-based approvals and transfers for any ERC20 token. Accordingly, the user 250 may have to sign the order before an actual swap or transaction can be performed. In some cases, the user may first be required to approve the smart contract before submitting a signed order.

Thus, a signed order 252 may be provided to the swap platform backend 254. The signed order 252 may include the configured parameters for the order, such as the input token, the input token amount, the output token, the starting/maximum output amount, the minimum output token amount, the time threshold or deadline for a Dutch auction, and so forth. The signed order 252 may include the generated grid curve that serves as a decay function, specifying how the auction price may decay over the duration of the auction (e.g., from the maximum amount of output token to the minimum amount of output token). The signed order 252 may include permission or authorization for the swap platform to move the user's tokens, which can be in the form of a signature-based approval (e.g., a digital signature of the user 250) associated with token approval functionality.

The swap platform backend 254 may provide this order information to a resolver 256 to evaluate. The resolver 256 may be able to determine if and how to fill the order (e.g., as a counterparty to the user 250). In some embodiments, a backend of the resolver 256 (e.g., an application or program) may automatically make the determination to determine if and how to fill the order without needing additional human intervention. The resolver backend may have logic for deciding which orders to fill and when to fill the order (e.g., at which block). Each resolver may employ their own logic to enable their transactions to be profitable. The swap platform does not mandate how the resolver 256 fills the order, and the resolver 256 is free to source liquidity from onchain liquidity venues like a DEX, offchain liquidity, or by pairing up the order with a complementary order (described in regards to FIGS. 8A and 8B).

Once the resolver 256 has decided if and when to fill the order, the resolver 256 may request fill of the order through one or more smart contracts 260 of the resolver 256, which initiates the onchain phase of executing the swap order. The resolver 256 may provide instructions and fill data to the resolver's smart contracts 260. The one or more smart contracts 260 of the resolver 256 may include a resolver implementation contract, a resolver worker contract, and/or a resolver backend, as described herein.

Accordingly, the resolver 256 is submitting the signed order 252 of the user 250 onchain, which means the resolver 256 will have to pay gas fees on behalf of the user 250. The resolver 256 may recoup these costs by factoring in these gas fees into the execution price and its decision regarding if/when to fill the order. In some embodiments, the resolver 256 may be able to bundle multiple orders into the same transaction, which is described in more detail in connection with FIG. 8A, FIG. 8B, and FIG. 10.

In some embodiments, the one or more smart contracts 260 of the resolver 256 may call one or more smart contracts 258 of the swap platform to actually resolve the swap order using details of the swap. The one or more smart contracts 258 of the platform may include a settlement protocol, a limit order protocol, and/or an aggregation protocol, as described herein. To resolve the order, the one or more smart contracts 258 of the platform may transfer input tokens from a wallet of the user 250 to an account of the resolver 256. The one or more smart contracts 258 of the platform may also transfer output tokens from the account of the resolver 256 to the wallet of the user 250.

In some embodiments, the smart contracts 258 of the swap platform may oversee settlement and execution of the swap. The smart contracts 258 may check or verify execution of the swap to ensure the swap order's conditions have been met or that the swap matches the parameters set by the user 250 (e.g., the amount of input tokens transferred from the user's wallet and the amount of output tokens transferred to the user's wallet). In some embodiments, the smart contracts 258 may be able to revert a swap that does not match the parameters set by the user 250.

Figure 3:
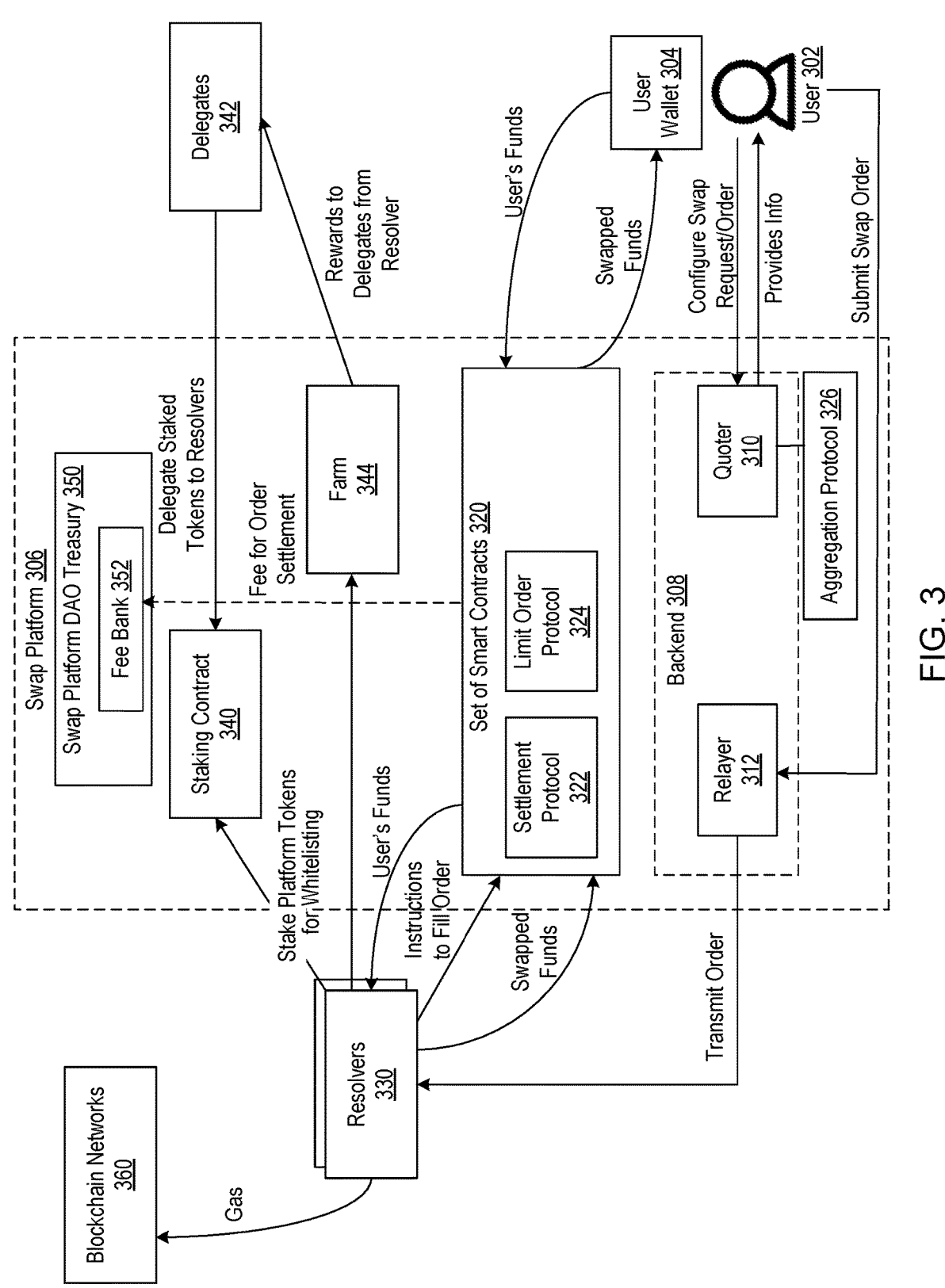
FIG. 3 is a flow diagram that illustrates a more detailed overview of the process for a gasless decentralized token swap, in accordance with embodiments described herein.

FIG. 3 is a flow diagram that illustrates a more detailed overview of the process for a gasless decentralized token swap, in accordance with embodiments described herein.

A user 302 that has a user wallet 304 (containing an amount of input token), may configure a swap request or order with the swap platform 306. The user 302 may configure this order with the swap platform 306 via an application or frontend on their user device, and the user 302 may be able to adjust and set swap parameters for the order using a user interface within the frontend. The swap order may be a limit order to exchange an amount of an input token (in the user's wallet 304) for an amount of an output token.

In some embodiments, as or after the user 302 configures their order and its parameters, the quoter 310 may receive the order parameters from the application or frontend on the user device. The quoter 310 may be a service of the backend 308 of the swap platform 306, which is configured to maximize swap output in the user's favor. In some embodiments, the quoter service 310 may obtain a current market price for the swap to provide estimates for the swap order.

In some embodiments, the quoter 310 may then use the received order parameters and the current market price to define a grid curve for executing the swap order. In some embodiments, the quoter 310 may calculate the grid curve based on current market price obtained from an aggregation protocol 326. In some embodiments, the order may direct the swap transaction to be executed based on a mechanism or approach that is designed to improve execution and the overall exchange rate that the user 302 receives. The grid curve generated by the quoter service 310 may be used as part of that execution approach. For example, in some embodiments, the transaction may be executed based on an auction mechanism that ensures that the user 302 receives at least a minimum guaranteed amount of the output token, enables the user 302 receives the best possible overall exchange rate, and/or maximizes the income or the amount of output tokens received by the user 302. In some embodiments, the user 302 may be able to configure the execution mechanism or approach (e.g., from among multiple options) as well as adjust different parameters associated with the chosen approach. In some embodiments, the transaction may be executed based on a Dutch auction mechanism. Additional information about Dutch auction mechanisms is provided in connection with FIGS. 5A-5E.

In some embodiments, the information collected and generated by the quoter 310 may be provided back to the user 302 to review and to assist in further configuring the order. Accordingly, as the user 302 changes the order and its parameters, the quoter 310 may collect, generate, and provide new information (such as the grid curve) back to the user 302 in real-time so that the user 302 can properly evaluate how the order is likely to be executed based on the selected parameters.

In some embodiments, the quoter 310, after defining a price curve, returns the results to the platform frontend, which displays the expected return amount to the user 302. In some embodiments, once the user 302 is satisfied with the configuration of the order, the user 302 may be able to initiate the submission of the order to the swap platform 306. More specifically, the user 302 may choose an option to submit the order within the platform frontend, and the user 302 may be requested to sign the order. If the user 302 signs the order, the signed order is sent from the platform frontend to a platform relayer 312.

In some embodiments, once the user 302 submits the order to the swap platform 306, a complex sequence of actions may be executed to resolve the swap-first offchain, then onchain. More specifically, there may be a sequence of actions that initially occurs offchain. In some embodiments, once the user 302 submits the order to the swap platform 306, the limit order smart contract may divide the requested order into parts, which allows the resolvers 330 to execute transactions in blocks, thus maximizing the output price for the user 302 and the income received by the resolvers 330

The swap platform 306 may have a platform relayer 312 transmit the order and its details to a set of whitelisted resolvers 330. The relayer 312 may be a service of the backend 308 of the swap platform 306, and the relayer 312 may be configured to relay order-specific information to the resolvers 330. For example, for a particular order, the relayer 312 may provide information about the tokens (e.g., the input/output tokens), the token amounts, and how the auction price changes over time.

The whitelisted resolvers 330 may use the order information to decide what to swap and when to swap (e.g., determine if and when to fulfill the order). The resolvers 330 may make these decisions based on some complex logic that is not open-source. More specifically, it may be a backend of a resolver 330 that determines if and when to fulfill the order, and the resolver backend may provide instructions to a worker or smart contract of the resolver to execute the swap via the set of smart contracts 320 of the swap platform 306 that serve as an intermediary. In some embodiments, the resolver 330 may earn revenue through arbitrage efforts or fees for order settlement and the resolver 330 may, from that revenue, pay blockchain network 360 the gas fees for the transaction.

The onchain phase of executing the swap may involve the resolver 330 sending instructions to fill an order to the set of smart contracts 320 of the swap platform 306. Examples of the set of smart contracts 320 used to resolve the swap may include a settlement protocol 322 and/or a limit order protocol 324.

In some embodiments, the set of smart contracts 320 may serve as an intermediary that oversees the transfer of funds to perform the swap. Upon receiving permission from the user, the set of smart contracts 320 may retrieve the amount of input token from the user wallet 304 to be transferred to the resolver 330. In exchange, the set of smart contracts 320 may retrieve swapped funds (e.g., an amount of output token) from the resolver 330 to be transferred to the user wallet 304.

In some embodiments, the resolvers 330 may collect and send a gas fee to the blockchain network 360 for executing the transaction. In some embodiments, the set of smart contracts 320 of the swap platform 306 may collect and send a gas fee directly to the blockchain network 360.

In some embodiments, the set of smart contracts 320 may collect a fee for order settlement (a transaction fee, not to be confused with gas fees) and transfer that fee to a fee bank 352. In some embodiments, the fee bank 352 may be part of a swap platform DAO treasury 350. In some embodiments, the set of smart contracts 320 may collect a fee for order settlement that goes to a third party or third parties.

In some embodiments, the whitelisted resolvers 330 may need to stake a sufficient amount of platform tokens via a staking contract 340 to be whitelisted for fulfilling user orders. In some embodiments, there may be delegates 342 (users of the swap platform 306 with staked tokens) that can delegate their staked tokens or voting power to a particular resolver to enable that resolver to meet the amount of staked tokens or voting power needed to be whitelisted or to move up in priority.

In some embodiments, the whitelisting of a resolver may create a farm 344 between that resolver and the delegates 342 that delegated to that resolver, and the farm 344 may be used to push rewards to those delegates 342. For example, a resolver may share a portion of their profits with the delegates 342 that delegated their staked tokens or voting power to the resolver.

Figure 4:
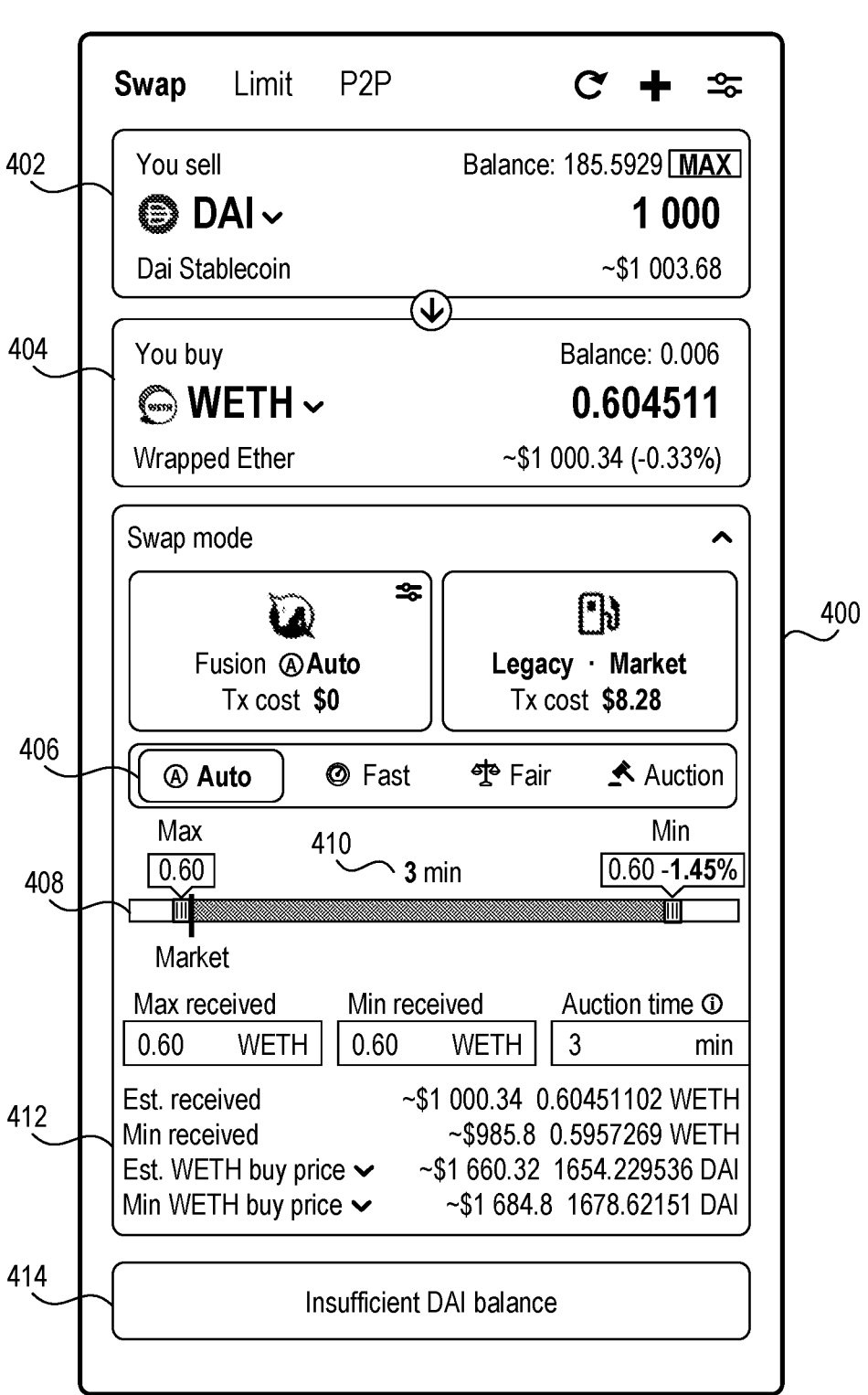
FIG. 4 illustrates an exemplary user interface of a frontend used in a gasless decentralized token swap, in accordance with embodiments described herein.

FIG. 4 illustrates an exemplary user interface of a frontend used in a gasless decentralized token swap, in accordance with embodiments described herein.

The user interface 400 may include a user interface element 402 that indicates the type of input token and the amount of the input token being swapped by the order, the approximate value (e.g., in USD based on current exchange rates) of the amount of the input token being swapped, and the total amount of the input token that the user has in their wallet. The user may be able to change the type of input token and the amount of the input token being swapped.

The user interface 400 may include a user interface element 404 that indicates the type of output token being swapped for, an estimate of the amount of the output token that will be obtained from the swap, the approximate value (e.g., in USD based on current exchange rates) of the amount of the output token being swapped for, and the total amount of the output token that the user currently has in their wallet. The user may be able to change the type of output token being swapped for.

The user interface 400 may include a user interface element 408 for displaying and setting constraints on the amount of the output token received in the swap (e.g., a maximum amount of the output token and a minimum amount of the output token). In some embodiments, the user interface element 408 may be a slider. There may be a first bar on the slider that corresponds to the maximum amount of output token. There may be a second bar on the slider that corresponds to the minimum amount of output token. Accordingly, the user may be able to adjust one or more of the bars on the slider to change the max and min amounts for the output token.

The user interface 400 may include a user interface element 410 for displaying and setting an auction time.

The user interface 400 may include a user interface element 412 that summarizes the order parameters and estimated outcomes for the transaction. For example, it may display the maximum output token received (and its corresponding value in USD), the minimum output token received (and its corresponding value in USD), the auction time, an estimated amount of output token received (and its corresponding value in USD), an estimated buy price (e.g., an amount of input token required and its corresponding value in USD), a minimum buy price (e.g., an amount of input token and its corresponding value in USD), and so forth.

The user interface 400 may provide user-selectable options for different execution approaches 406 for the order. For instance, as shown in the figure, the different execution approaches 406 include "Auto," "Fast," "Fair," and "Auction." If a user switches between the execution approach presets (Auto, Fast, Fair, Auction), they would notice that the estimated values shown in the user interface element 412 change. In some embodiments, these estimated values are obtained from a quoter service (e.g., a backend service of the swap platform). The quoter may be a backend service that is designed to maximize the swap output in the user's favor. The frontend application may send order parameters to the quoter service. For instance, in this example, the frontend application may inform the quoter that DAI is the input or source token, that WETH is the destination token and that the swap amount is 1000 DAI. The quoter may retrieve the current market price from an aggregation protocol of the swap platform. The quoter may define a grid curve (e.g., a limit price curve) based on the current market price and the order parameters provided by the frontend application.

In some embodiments, selecting the "Fast," "Fair," or "Auction" execution approaches may result in the use of a Dutch auction mechanism, which is described in more detail in connection with FIGS. 5A-5E. In some embodiments, the Dutch auction may last for the specified duration and pricing may follow the defined grid curve over the duration of the auction. In some embodiments, selecting the "Auto" execution approach may result in the application selecting the best preset (e.g., "Fast," "Fair," or "Auction") based on the order parameters. In such embodiments, the "Auto" mode will always be the same as one of the presets.

In the figure, the user has configured an order in the user interface 400 to swap 1000 DAI to WETH. The user interface 400 immediately estimates this swap and provides that information in the user interface element 412. More specifically, the order parameters are sent to a backend quoter service, which responds with the current market exchange rate. The user interface 400 (e.g., the user interface element 412) is immediately updated to show estimated transaction results. It shows that, optimistically, the user would receive 0.604511 WETH+optimistic rates, and at the very least, the user would receive 0.5957269 WETH+pessimistic rates. The difference between these two values is 1.45%, which is shown in the user interface 400 (e.g., right above the slider). The user interface 400 also shows that the auction for the swap will last, at maximum, 3 minutes.

Figure 5A:
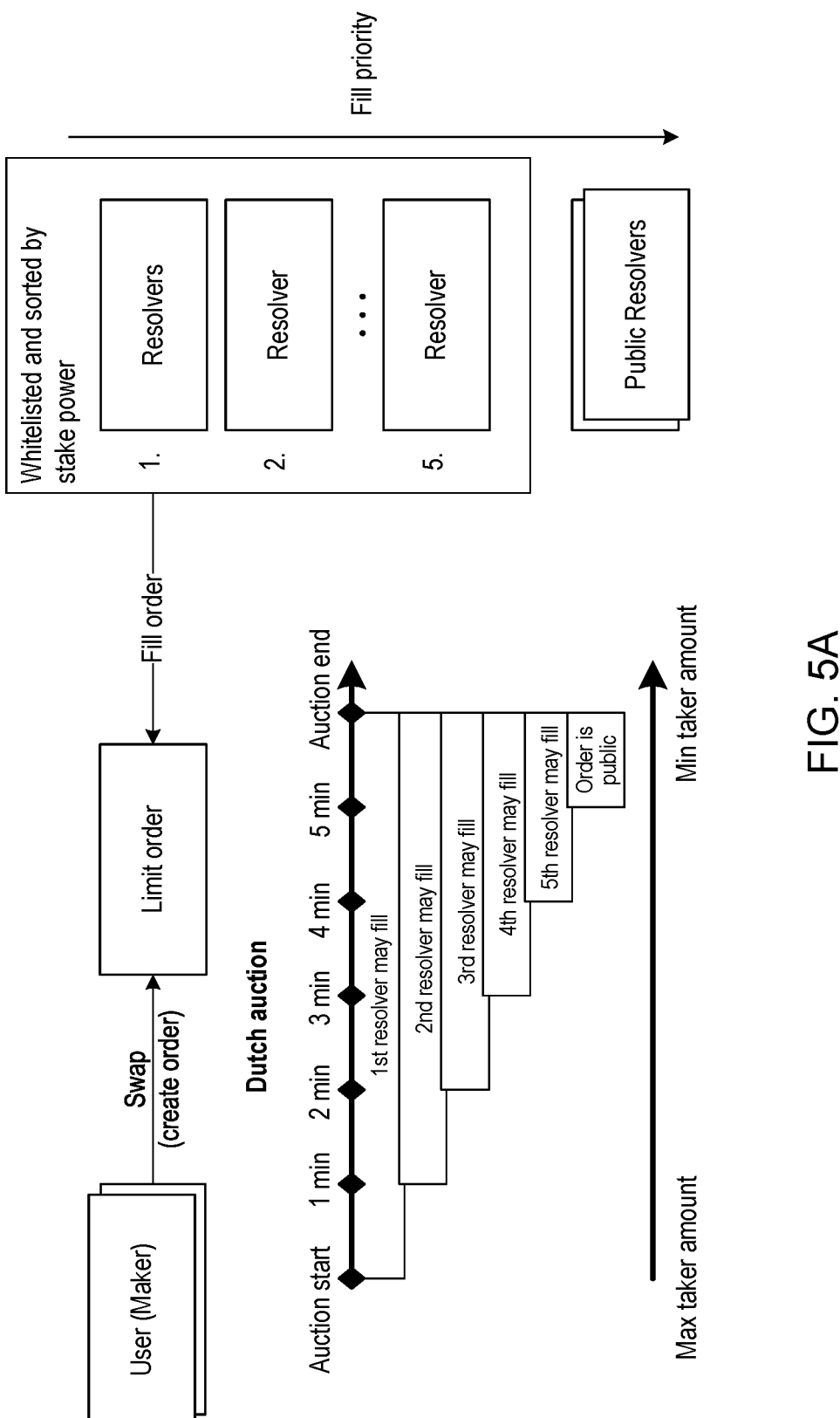
FIG. 5A shows a schematic of a method or execution approach for fulfilling a swap order, in accordance with embodiments described herein.

FIG. 5A shows a schematic of a method or execution approach for fulfilling a swap order. In some embodiments, a Dutch auction can be used to fulfill the swap order. In some embodiments, the Dutch auction can be performed over a period of time. In some embodiments, the Dutch auction can have a start time and an end time. In some embodiments, at the start time, a set of smart contracts can transmit an order to a first resolver with the highest priority on a whitelist. In some embodiments, the priority feature is not enabled, and all resolvers compete to fill the order at the same start time. In some embodiments, the order may be for the maximum threshold as described above with reference to FIGS. 5B-5E. In some embodiments, if the order is not fulfilled by a first time threshold, the set of smart contracts can transmit the order to the first resolver and a second resolver with a second highest priority on the whitelist. In some embodiments, the second order can include a desired amount between the maximum threshold and the minimum threshold. In some embodiments, the set of smart contracts can continue to reduce the desired amount (e.g., the auction price) if the order has not been fulfilled by a plurality of predetermined thresholds. In some embodiments, each time the set of smart contracts reduces the desired amount, the set of smart contracts can transmit the order to additional resolvers on the whitelist with lower priority. In some embodiments, once the set of smart contracts reduces the desired amount to the minimum threshold, the set of smart contracts can transmit the order to all whitelisted resolvers until the swap request is fulfilled.

In some embodiments, there may not be any public, non-whitelisted resolvers and only whitelisted resolvers are allowed to participate to fill orders. In other embodiments, there may be public, non-whitelisted resolvers that are allowed to participate to fill orders. For example, after a certain amount of time has elapsed in the auction associated with a particular order, participation may open up to allow public, non-whitelisted resolvers to fill the order.

Figure 5B:
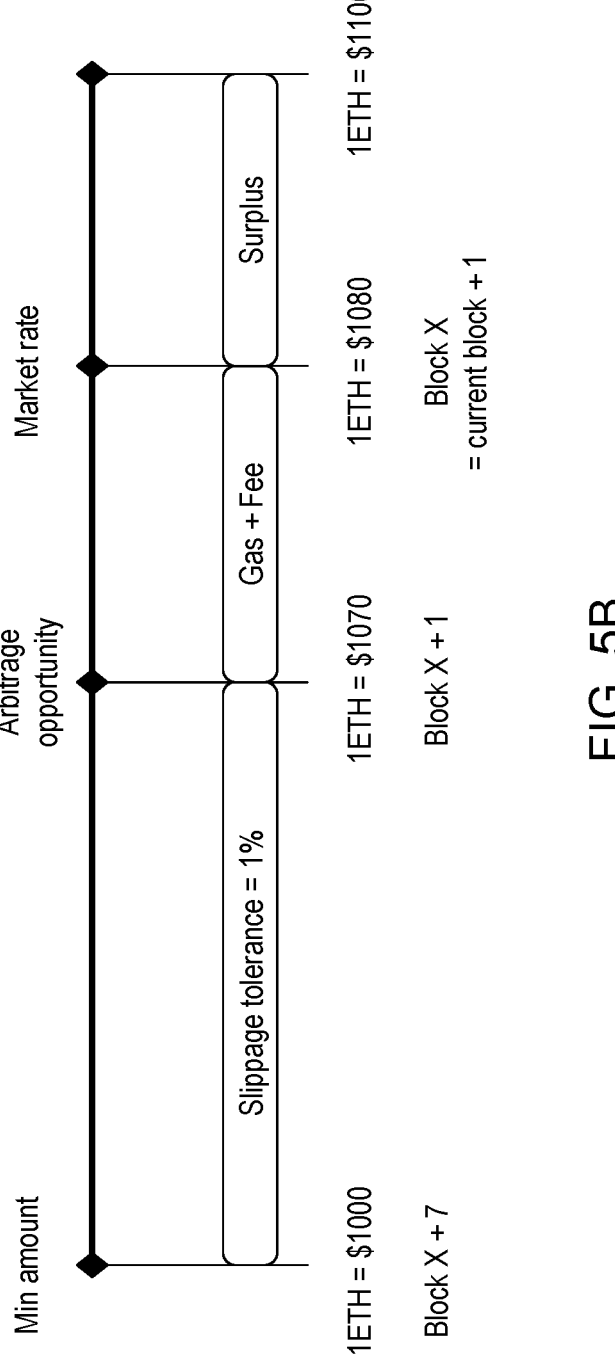
FIG. 5B shows a schematic of a plurality of swap thresholds associated with a Dutch auction execution approach, in accordance with embodiments described herein.

FIG. 5B shows a schematic of a plurality of swap thresholds associated with a Dutch auction execution approach. In some embodiments, the plurality of swap thresholds can be based on a user selection of one of a plurality of execution approaches. In some embodiments, a plurality of swap thresholds can be calculated via one or more equations shown in FIG. 5C. In some embodiments, a first swap threshold can be automatically determined or calculated. In some embodiments, the first swap threshold can be equal to: MarketRate–GasForecast–OrderFee. In some embodiments, MarketRate can be a current market exchange rate of the swap. In some embodiments, the GasForecast can be a gas estimate for the swap. In some embodiments, the OrderFee can be an amount transmitted by the resolver to complete the swap.

In some embodiments, a second swap threshold can be automatically determined or calculated. In some embodiments, the second swap threshold can be equal to the MarketRate.

In some embodiments, a third swap threshold can be automatically determined or calculated. In some embodiments, the third swap threshold can be equal to: MarketRate*(1+K). In some embodiments, K can be a rate improvement coefficient.

In some embodiments, the first swap threshold, the second swap threshold, and/or the third swap threshold can include maximum threshold and/or a minimum threshold. In some embodiments, as shown in FIG. 5D, the maximum threshold can be equal to the swap threshold multiplied by a swap amount (MakerAmount). In some embodiments, as shown in FIG. 5E, the minimum threshold can be equal to the swap threshold multiplied by the swap amount (MakerAmount) and one minus a SlippageTolerance. In some embodiments, the swap amount (MakerAmount) can be a value or number of tokens the user is swapping. In some embodiments, the SlippageTolerance can be a percentage. In some embodiments, the minimum threshold and/or the maximum threshold can define a range of an amount of desired swap funds the user wants to receive from the swap or exchange.

Figure 6A:
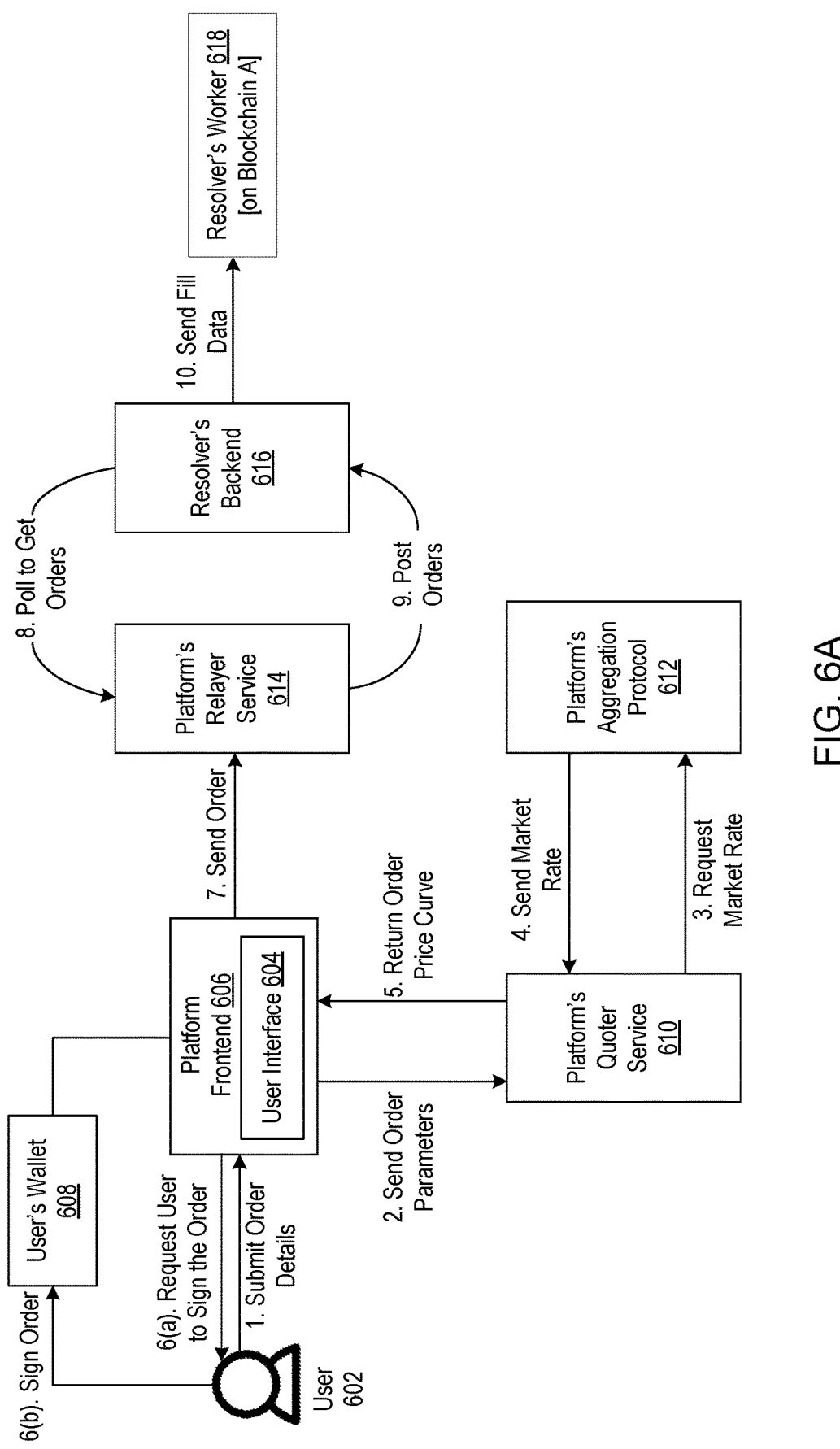
FIG. 6A illustrates a flow diagram that illustrates an offchain phase of a gasless decentralized token swap, in accordance with embodiments described herein.

FIG. 6A illustrates a flow diagram that illustrates an offchain phase of a gasless decentralized token swap, in accordance with embodiments described herein.

A user 602 (e.g., on their user device) may create and submit an order using the user interface 604 of an application or frontend 606 of a swap platform. More specifically, the order may be a limit order for exchanging an amount of an input token for an amount of an output token (e.g., a swap transaction). The user's wallet 608 may be linked to the frontend 606, and the wallet 608 may contain the input tokens for the swap. The user's wallet 608 may also be used to receive the output tokens from the swap.

As the user 602 provides order details and adjusts/sets parameters for the order within the user interface 604, the frontend 606 may send the order parameters to the quoter service 610 of the swap platform. The quoter service 610 may be a backend service of the swap platform that is configured to maximize swap output in the user's favor.

The quoter service 610 may request the current market rate (for swapping the input token to the output token) from an aggregation protocol 612 of the swap platform. The aggregation protocol 612 may send the current market rate back to the quoter service 610. The quoter service 610 may use the current market rate to determine an estimated return amount of output token. The quoter service 610 may use the current market rate and the order parameters (received from the frontend 606) to define a grid curve, which may be a limit price curve that serves as an approach for executing the swap. The logic of the quoter service 610 used to generate the grid curve may be fine-tuned over time using data of filled orders.

In some embodiments, the quoter service 610 may send the grid curve to the frontend 606. In some embodiments, the quoter service 610 may send the current market rate to the frontend 606, although that information could be baked into the grid curve. In some embodiments, the quoter service 610 may send estimates associated with the order to the frontend 606. The frontend 606 may use the data it receives from the quoter service 610 to update and display estimates associated with the order (e.g., the estimated amount of output token returned) to the user. In some embodiments, the frontend 606 may periodically receive data from the quoter service 610 while the user is configuring their order in the frontend 606. For example, the frontend 606 may receive order estimates from the quoter service 610 every 12 seconds and display updated order estimates for the user.

Once the user 602 has finalized and elected to submit the order, the frontend 606 may request that the user 602 confirm the swap. In some embodiments, the frontend 606 may require that the user 602 sign the order with their wallet 608. In some embodiments, for security purposes, there may be a specific timeframe in which the user 602 must sign the order. For example, after the user 602 clicks "Confirm Swap" in the frontend 606, the user may have 24 seconds to sign the order in their wallet 608.

The frontend 606 may send the order to a relayer service 614 of the swap platform. The relayer service 614 may be a backend service that stores received orders and provides order information to resolvers to act on. In some embodiments, the relayer service 614 may store orders in a data store or database (not shown). In some embodiments, if the order is not properly signed or the user 602 has not provided the proper authority/permission to perform the swap transaction, the relayer service 614 may not accept the order because prices may change very quickly on the market. For instance, a price curve estimated more than 2 blocks prior (e.g., 2 blocks have been added to the blockchain over the elapsed time) may become irrelevant. If the market price goes too far in a user's favor, the resolvers may not fill it. If the market price goes too far against the user's favor, resolvers may fill the order but the user may not receive the outcome they were expecting. So, it may be critically important to sign the submitted order as soon as possible. In some embodiments (not shown), once the order is received by the swap platform, the limit order smart contract may divide the requested order into parts to allow resolvers to execute transactions in blocks.

In some embodiments, resolvers (more specifically, the backend 616 of the resolver) may obtain user orders from the relayer service 614, including this order from user 602. In some embodiments, the resolver backend 616 may poll the relayer service 614 to retrieve orders. For example, the resolver backend 616 may request orders from the relayer service 614 via an API of the swap platform. In some embodiments, the relayer service 614 may broadcast orders to the backend 616 of any whitelisted resolvers. For instance, the relayer service 614 may be connected to resolvers via websocket protocol and can push out all the orders available for filling over the existing websocket connection. In some embodiments, for a swap order, the relayer service 614 may provide information such as the input token, the amount of input token, the output token, the amount of output token, how the auction price changes over time, and so forth.

Once a resolver backend 616 obtains orders, including this order for the user 602, the resolver backend 616 may have logic for deciding which orders to fill and when to fill the order (e.g., at which block). Each resolver may employ their own logic to enable their transactions to be profitable, essentially making the backend 616 a black box to outside observers. Once the backend 616 has decided if and when to fill an order, the backend 616 may provide instructions and fill data to the resolver's worker 618. The worker 618 may be a smart contract or an account that fills the order on behalf of the resolver.

Figure 6B:
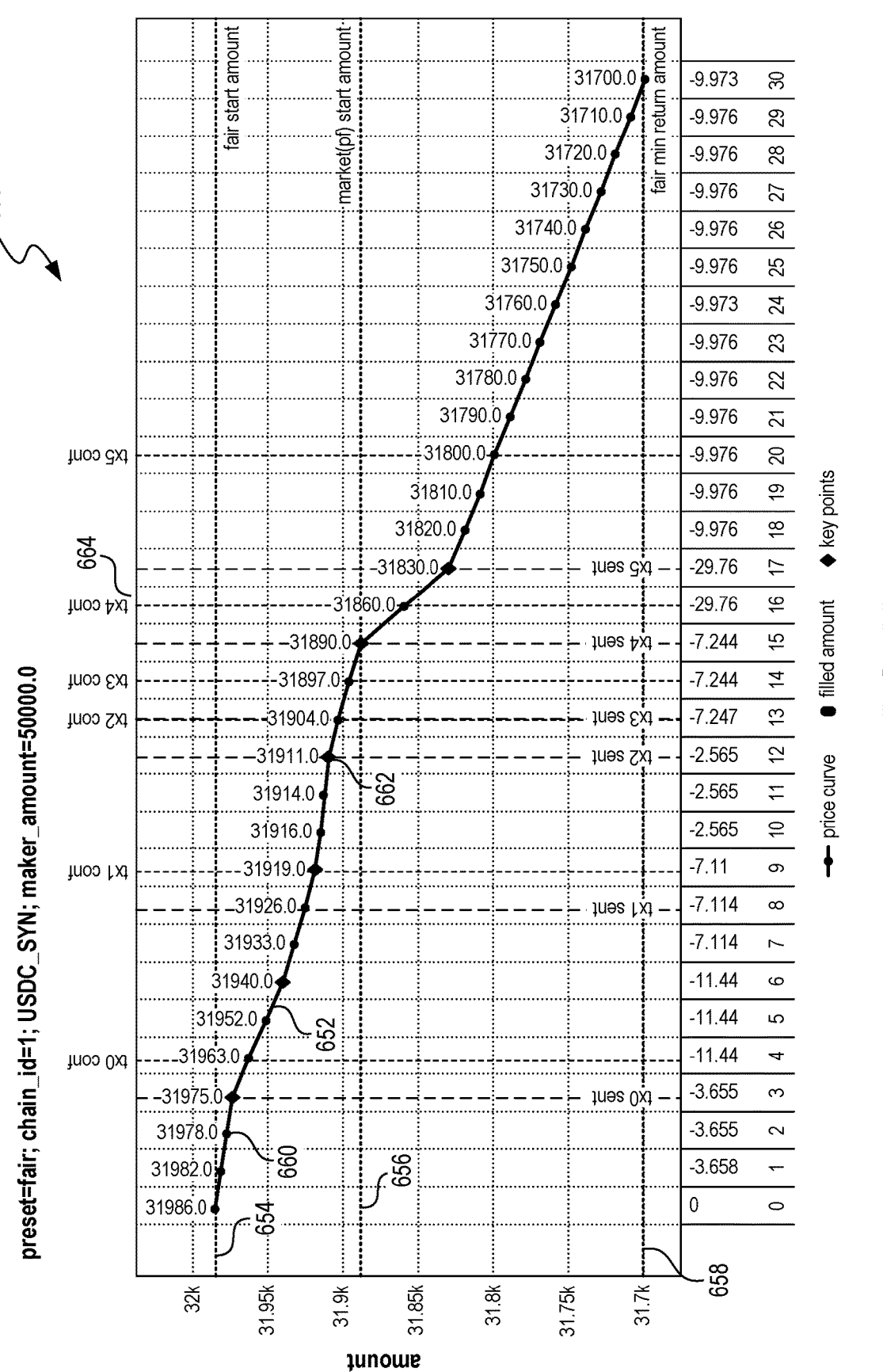
FIG. 6B illustrates an exemplary grid curve generated by a quoter service of a swap platform, in accordance with embodiments described herein.

FIG. 6B illustrates an exemplary grid curve generated by a quoter service of a swap platform, in accordance with embodiments described herein. In some embodiments, different grid curves may be generated and deployed for different orders or contexts (e.g., different token pairs, different amounts, etc.).

A quoter service may receive order parameters from the frontend of the swap platform and the current market rate from the aggregation protocol. The quoter service may use that information to generate a grid curve that determines the amount a resolver must return to a user in each given block (e.g., interval over the duration). FIG. 6B shows a chart 650 that displays such a grid curve for an order submitted with a "Fair" preset, and the chart 650 also indicates how a resolver filled that order over 5 transactions. The Y-axis represents amounts of output token to be returned to the user. The X-axis represents time and spans the duration of execution (e.g., the duration of the auction), and it can be divided into blocks.

A top horizontal dotted line 654 marks the auction start amount of output tokens (32K) based on the "Fair" preset. A middle horizontal dotted line 656 represents the market amount of output tokens that the user would receive based on the current market price (e.g., received from the aggregation protocol), which in this case is about 31.89K. A bottom horizontal dotted line 658 represents the minimum amount of output tokens (31.7K) that the user would receive at the end of the auction based on the "Fair" preset.

The grid curve 652 is a price curve that determines the amount of output token (Y-axis) to be received by a user in a certain block. It decreases slowly as the auction time passes. The points 660 on the grid curve 652 indicate block timestamps. This particular auction lasted for 30 blocks, from 0 to 30. In the case where Ethereum is the underlying blockchain for recording transactions, this would translate to roughly 360 seconds (6 minutes) because an average block validation time in Ethereum is 12 seconds. In each block, the exchange rate and the amount of output token a resolver must return to a user is different. Anything that the resolver receives that exceeds this specified amount of output token returned to the user (e.g., an "equivalent" amount of input token) would be profit for the resolver. Accordingly, a resolver may have their own backend logic for determining if and when to fill orders to generate profit.

The diamond-shaped points 662 on the grid curve 652 represent key points 662, which are the points when the curve changes its angle (which represents the price drop speed). At first the amount decreases slowly, then at a key point in the 3rd block, the speed of the price drop increases, and so on. On this particular chart 650, there are key points at the 3rd, 6th, 9th, 12th, 15th and 17th blocks. The grid curve 652 and its key points 662 may be determined by the order parameters and the execution approach (e.g., preset) selected within the frontend.

The vertical lines 664, which are not part of the grid curve 652 generated by the quoter service, indicate the transactions in which a resolver filled at least a part of the order.

Figure 7:
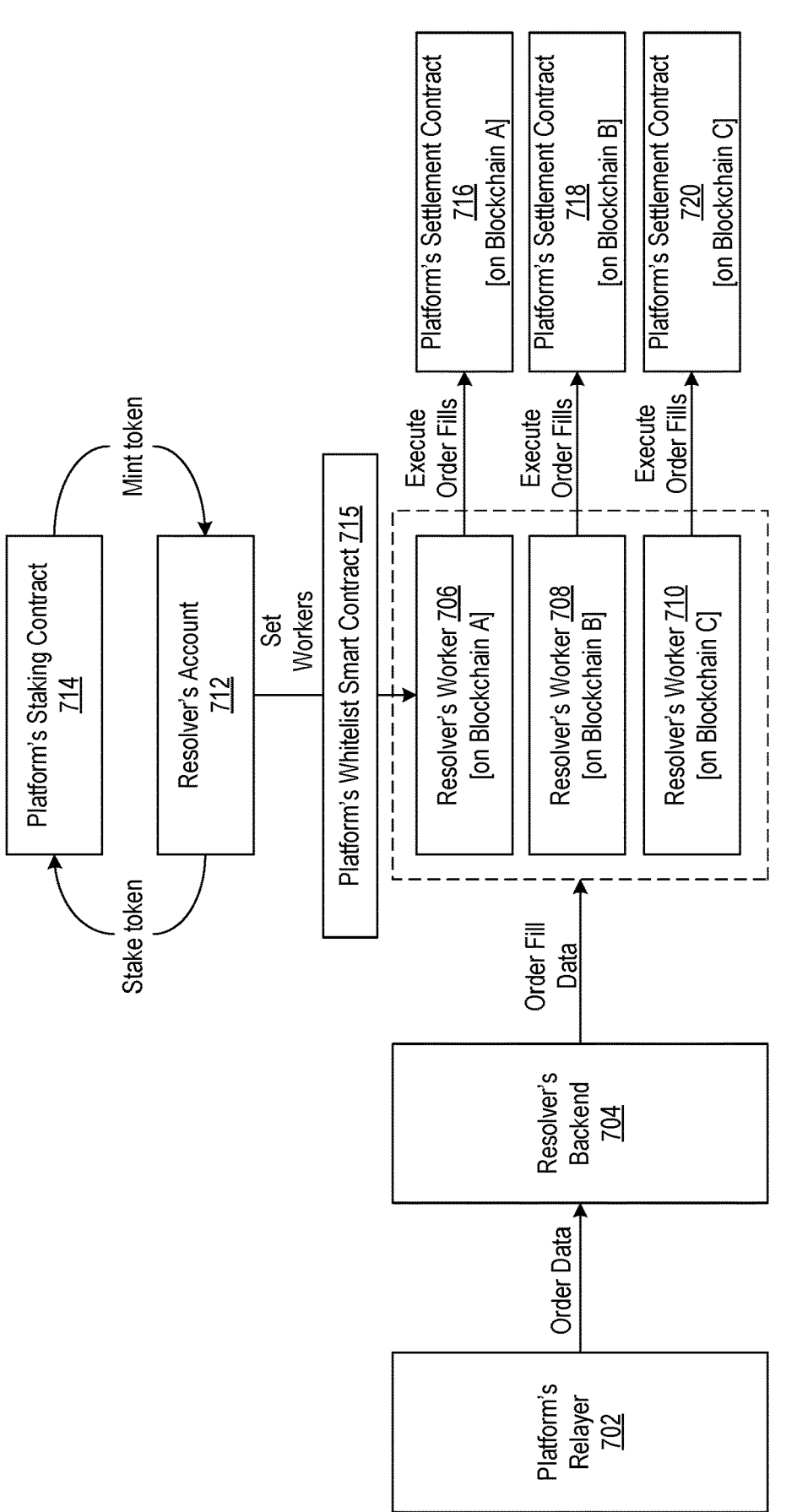
FIG. 7 is a flow diagram that illustrates how a resolver may fill swap orders associated with different types of tokens, in accordance with embodiments described herein.

FIG. 7 is a flow diagram that illustrates how a resolver may fill swap orders associated with different types of tokens, in accordance with embodiments described herein.

A resolver's architecture may comprise a set of onchain and offchain applications or components for use with the swap platform to fill swap orders. In some embodiments, this set of applications or components may comprise a backend (e.g., backend 704), an account (e.g., account 712), and one or more workers (e.g., workers 706, 708, 710). These applications may resolve limit orders or swap orders submitted by users of the swap platform, and they may do so automatically without requiring humans to make the necessary trades for resolving the orders. These applications are provided some degree of freedom in their logic for deciding if and when to fill swap orders so that the resolvers can optimize their own income received from filling swap orders. However, the swap platform has mechanisms in place to ensure that a user submitting a swap order receives at least the minimum guaranteed amount of output tokens (minimum to receive) and the auction mechanism is designed to provide the user with the best possible price and maximize the user's income.

As shown in the figure, once a user has submitted a limit order for a swap to the swap platform, the relayer 702 of the swap platform may provide the order data to the backend 704 of a resolver. In some embodiments, the resolver's backend 704 may be a server-side application hosted by the resolver and connected to the swap platform (e.g., the backend of the swap platform) via API. The resolver's backend 704 may receive orders and order information from the relayer service 702 running on the swap platform backend. For a particular order, the resolver's backend 704 may receive information about tokens (e.g., the type of input token and output token), token amounts, and how the auction price changes over time from the relayer 702. The resolver's backend 704 can then decide what to swap and when to swap (e.g., which orders to fill at which moment) based on some complex logic that is not open source.

Once the resolver's backend 704 has determined to fill the user's order and how to fill the user's order, the resolver's backend 704 may send order fill data or instructions to a worker of the resolver (e.g., the workers 706, 708, 710). A resolver may have one or more workers, which may be smart contracts or just wallets (externally owned accounts, EOA) that are associated with a resolver's account 712. In some embodiments, there may be a separate worker per each blockchain network used to record transactions. For example, a resolver may choose to support three blockchain networks (e.g., Ethereum, BNB Chain and Polygon), and a resolver can have one worker per blockchain. As shown in the figure, the resolver has three workers—workers 706, 708, and 710—which correspond to blockchain A, blockchain B, and blockchain C, respectively. The resolver's backend 704 may send the instructions and order fill data to the worker associated with the blockchain that the transaction would be recorded on. For example, if the transaction for the order would involve blockchain A, the resolver's backend 704 would send the order fill data to the resolver's worker 706 on blockchain A.

Once a worker receives instructions from the resolver's backend about orders to fill, that worker may then call a settlement protocol or smart contract of the swap platform to execute fills of the order. In some embodiments, the swap platform may have a separate settlement protocol or smart contract per each blockchain network used to record transactions. The worker may call a settlement protocol or smart contract that corresponds to the same blockchain network that the worker is associated with. As shown in the figure, the swap platform has three settlement contracts-settlement contracts 716, 718, and 720, which correspond to blockchain A, blockchain B, and blockchain C, respectively. Accordingly, if the transaction for the order involves blockchain A and the resolver's backend 704 sent instructions to worker 706, the worker 706 may call on the platform's settlement contract 716 on blockchain A to execute fills of the order.

Depending on the implementation, a worker can have a role in executing swaps themselves and/or utilize external smart contracts for executing swaps. In some embodiments, the resolver's worker may call an aggregation protocol of the swap platform, which consists of a set of smart contracts used to execute swaps, to perform a swap of the source token to destination token, if necessary. Alternatively, the resolver's worker may use any other external liquidity source.

In some embodiments, a resolver's worker may need to be on a whitelist of the swap platform to successfully call a settlement contract of the swap platform. In some embodiments, a resolver's account (e.g., resolver's account 712) may be used to set and designate the resolver's workers and whitelist them. In some embodiments, this may involve the resolver setting a worker address for each blockchain network. Accordingly, in some embodiments, once the resolver's backend 704 sends order fill instructions, the quoter may fetch the worker's address and worker's address may be included in the order fill instructions. In some embodiments, setting, designating, and whitelisting a resolver's worker may involve the resolver calling the swap platform's whitelist smart contract 715. In some embodiments, the resolver's account 712 may be an account or multi-signature wallet (e.g., Gnosis) of the resolver that is external to the swap platform. In some cases, a multi-signature wallet may be employed and controlled by a group of physical persons. In some embodiments, the resolver's account 712 may hold platform tokens. The resolver's account 712 may be used to stake platform tokens to the swap platform's staking contract 714 to receive voting tokens and voting power, which can be used to whitelist workers to resolve swaps and participate in DAO governance of the swap platform.

Figure 8A:
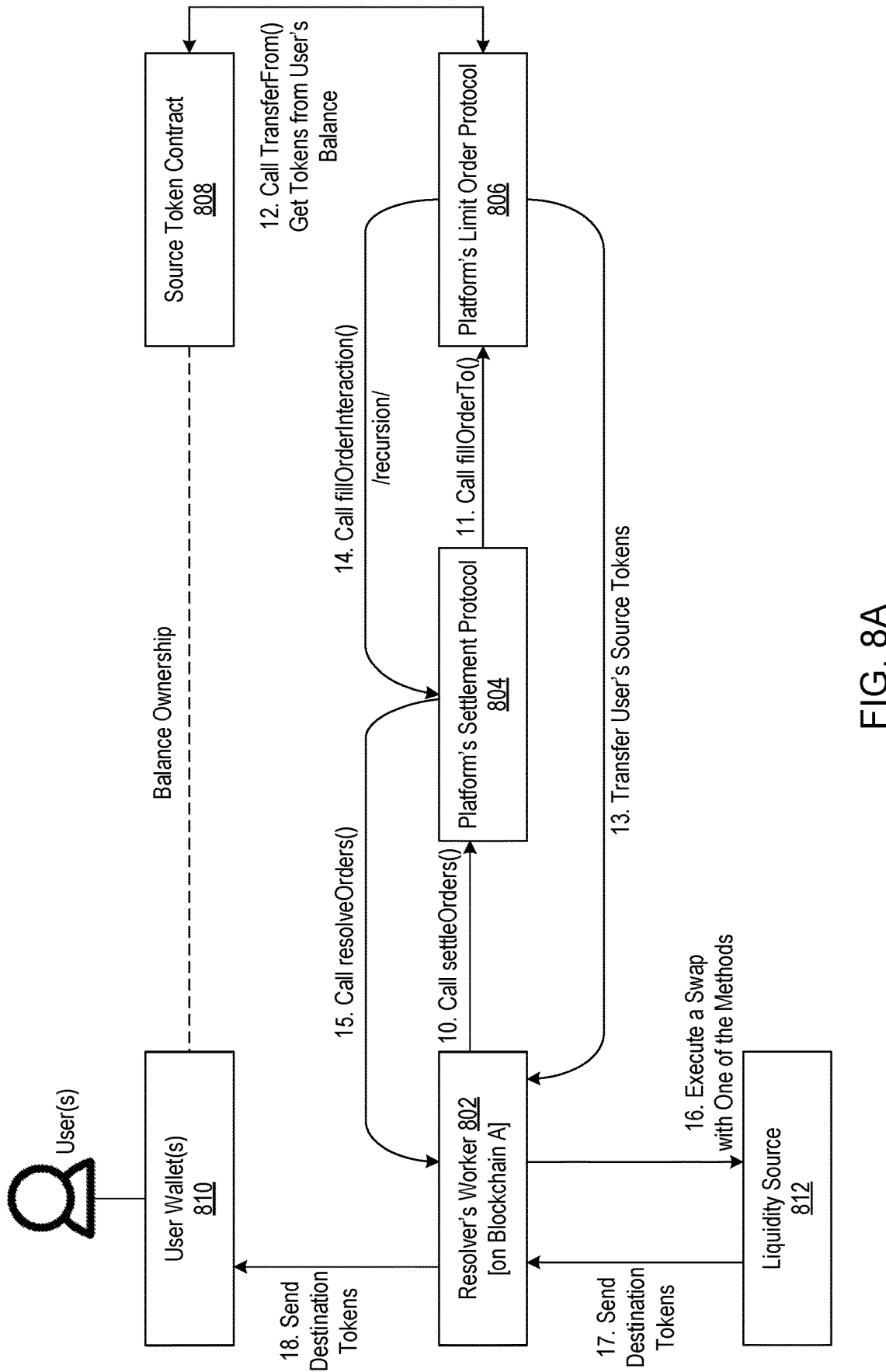
FIG. 8A is a flow diagram that illustrates an onchain phase for executing fills of a gasless decentralized token swap order, in accordance with embodiments described herein.

FIG. 8A is a flow diagram that illustrates an onchain phase for executing fills of a gasless decentralized token swap order, in accordance with embodiments described herein.

At the end of the offchain phase (e.g., such as the examples depicted in FIG. 6A and FIG. 7), a resolver's backend decides to make a fill of an order that it received from the swap platform's relayer service. More specifically, the backend decides to fill the order at a certain block (e.g., at a certain time window in the duration of an auction), which corresponds to a certain amount of output token to be returned to the user (identifiable based on the generated grid curve). The backend then provides the resolver's worker with information about the selected orders and instructions to fill those orders, which initiates the onchain phase of the swap resolving process. In some cases, the resolver may be able to make several fills in one batch, up to 32 orders. Normally, there are numerous token balances on the resolver worker contract and the backend can take several orders from the "stream" of orders provided by the platform's relayer service and make a sequence of fills.

An example scenario would be a situation where the resolver backend selects 3 swap orders from the relayer to fill: (1) 100 DAI for at least 0.6 WETH; (2) 0.6 WETH for at least 100 DAI; and (3) 0.01 WBTC for at least 36 UNI. Ignoring profit considerations, the business goal of the resolver may be to execute all 3 swaps such that the users get at least the specified minimum amount of output token (in practice, the resolver may take expenses such as gas fees into account to make sure that the swaps are profitable while staying within the quoter-provided framework for maximizing the users' income). The resolver's backend may provide the information about these 3 selected orders to the resolver's worker (e.g., a smart contract or wallet).

As shown in the figure, the resolver's worker 802 may be a smart contract or an externally owned account (EOA) set up by a resolver. The resolver may have more than one worker 802, such as a worker 802 for each blockchain network. The worker 802 may be configured to receive instructions from the resolver's backend about an order to fill (e.g., at the end of the offchain phase illustrated in FIG. 6A) and then kick off a sequence of actions that occurs on the blockchain to execute filling the user's order, such as by calling a settlement protocol 804 of the swap platform to execute the fill of the order. In some embodiments, the resolver's worker 802 must be whitelisted to be able to call a settlement protocol 804 of the swap platform.

The specific implementation for the worker 802 may be up to the resolver. For example, the resolver's worker 802 may have a contract with a resolveOrders( ) function to resolve swaps or a contract that implements the IResolve interface, and the settlement protocol 804 of the swap platform may make a callback to this contract. In some embodiments, the worker 802 is a smart contract and has the resolveOrders( ) function, so the settlement protocol 804 calls back to the same address as it was initially called. In such cases, the worker 802 actually resolves the order and sends the output tokens to the user's wallet. In some embodiments, the worker 802 is a smart contract but the resolveOrders( ) function is implemented in some other contract that the settlement protocol 804 calls back to. In some embodiments, the worker 802 is an EOA that calls the settlement contract 804, but the settlement contract 804, in turn, calls back to a different resolver's smart contract that has the resolveOrders( ) function.

In some embodiments, the worker 802 may call a settleOrders( ) function of the settlement protocol 804 of the swap platform, passing order information for the orders in the batch in a lightweight compressed format of bytes. For instance, the order information for an order that is provided to the settlement protocol 802 may include the input token, an amount of input token, the output token, an amount of output token, and so forth. In some embodiments, for an order, the settlement protocol 804 may obtain the value for a "rate bump" from the quoter service of the swap platform because the current market rate may have changed since the user configured that order. The rate bump may effectively determine the return of the swap transaction, and it may be a percentage difference between the current auction amount and minimal auction amount. For example, if the rate bump value is 50% and the minimum auction amount to return is 500, then the current auction taking amount may be 750. In some embodiments, the settlement protocol 804 may calculate the total fee amount that the resolver should pay to the swap platform.

In some embodiments, the settlement protocol 804 of the swap platform may be a set of smart contracts deployed by the swap platform, which together act as an intermediary between a resolver's worker 802 and the limit order protocol 806 of the swap platform. In some embodiments, the settlement protocol 804 may have swap execution logic on it, such as Dutch auction logic with the limit price decreasing over time (e.g., the duration of the auction) implemented. In some embodiments, the settlement protocol 804 may be configured to receive order fill transaction data from a resolver's worker 802. The settlement protocol 804 may call the limit order protocol 806 of the swap platform to settle the order partially or fully.

In some embodiments, once order information is passed to the settlement protocol 804, the settlement protocol 804 may then call a fillOrderTo( ) function of a limit order protocol 806 of the swap platform, forwarding the data for one of the three orders in the list (e.g., the first order involving 100 DAI for at least 0.6 WETH). In some embodiments, the settlement protocol 804 may inform the limit order protocol 806 that there are additional orders (e.g., 2 more orders in a batch) that will have to be executed afterwards. In some embodiments, the settlement protocol 804 may forward to the limit order protocol 806 either a making or taking amount. Setting the making amount may specify an amount that the resolver would like to receive, and setting the taking amount may specify an amount that the resolver would like to sell. Setting the making amount may result in the taking amount being automatically calculated based on the making amount (and the current market rate), and vice versa. In some embodiments, the settlement protocol 804 may forward the address of the worker 802 contract that will receive the input tokens.

In some embodiments, the limit order protocol 806 of the swap platform may be a set of smart contracts deployed by the swap platform, which together are used for settling limit orders with a dynamic limit price that is implemented on the settlement protocol 804. In some embodiments, the user may provide authority (via permit or approve, depending on the token contract type) so that the limit order protocol can transfer an authorized amount of input token from the user's wallet. In some embodiments, the limit order protocol 806 may have a fillOrderTo( ) function that is used to actually trigger the token transfer from the user to the resolver.

In some embodiments, for the order passed from the settlement protocol 804, the limit order protocol 806 may then call a TransferFrom( ) function of a source token contract 808 to transfer the swap amount of input token from the balance of the user wallet 810 (e.g., the wallet of the user that submitted this particular order) to the resolver's worker 802 contract using ERC20 Solidity interface.

In some embodiments, the source token contract may be an ERC20 contract of the input token (supporting or not supporting permits in addition to approvals) in the swap. The limit order protocol 806, with the user's authorization, may be able to call a transferFrom( ) function of the source token contract 808 to transfer funds from the user's wallet.

Afterwards, the limit order protocol 806 may call back to the settlement protocol 804 with a call to the fillOrderInteraction( ) function of the settlement protocol 804, sending information about any further orders in the batch (e.g., 0.6 WETH for at least 100 DAI, and 0.01 WBTC for at least 36 UNI).

If there are no more orders in the batch, the settlement protocol 804 may call the resolver's worker 802 contract and tell the worker 802 to resolve orders. This may be possible because the worker 802 will import a swap platform interface called IResolver. Alternatively, if there are orders left in the batch, the settlement protocol 804 handles the next order in the batch by again calling the fillOrderTo( ) function of the limit order protocol 806, which will call the TransferFrom( ) function of the source token contract 808 to transfer the swap amount of input token from the wallet of the user that submitted that order (who will likely be different from the user that submitted the first order) to the resolver's worker 802 contract. Afterwards, the limit order protocol 806 may call back to the settlement protocol 804 to check if there are any more orders left in the batch. In this manner, the settlement protocol 804 and the limit order protocol 806 may keep exchanging data to recursively handle orders one-by-one until all the orders are ready to be settled and all the funds are collected from the user wallets that correspond to those orders (e.g., 100 DAI, 0.6 WETH, and 0.01 WBTC for the 3 orders).

Once the resolver's worker 802 contract has received all the funds from the users through the settlement protocol 804 and the limit order protocol 806, the worker 802 can resolve the orders by sending output tokens to the user wallets corresponding to the orders in the batch. In some embodiments, the worker 802 may match up complementary orders in the batch to reduce the number of additional actions that need to be performed, thereby improving efficiency. For instance, consider the example in which the batch contained three orders from three separate users: 1) 100 DAI for at least 0.6 WETH; (2) 0.6 WETH for at least 100 DAI; and (3) 0.01 WBTC for at least 36 UNI. The first order could be matched with the second order without any additional actions needing to be performed. So the resolver's worker 802 could send 0.6 WETH collected from the user that submitted the second order to the user that submitted the first order, and also send the 100 DAI collected from the user that submitted the first order to the user that submitted the second order. Thus, two out of the three orders can be resolved using the tokens collected from the orders or the tokens that the worker 802 has on balance.

However, in some cases the matching up of complementary orders will not be possible. For example, there is no complementary order for the last order to swap 0.01 WBTC for at least 36 UNI. In such instances, if the worker 802 contract does not have the appropriate token (e.g., 36 UNI) on its balance, the worker 802 can use an external liquidity source 812 to bring 36 UNI to the resolver's worker 802, which then sends them to the user. In some embodiments (not shown), the resolver's backend can call an aggregation information service of the swap platform, such as 1inch Pathfinder, in order to obtain an optimal route and pass it to the worker 802 for execution.

In some embodiments, there may be a resolver smart contract (not shown) or resolver implementation contract. The resolver smart contract may be a smart contract deployed separately from the resolver's worker 802 when the worker 802 does not have the resolveOrders( ) function. In such cases, the resolver smart contract may actually resolve the order and send output tokens to the user's wallet.

Figure 8B:
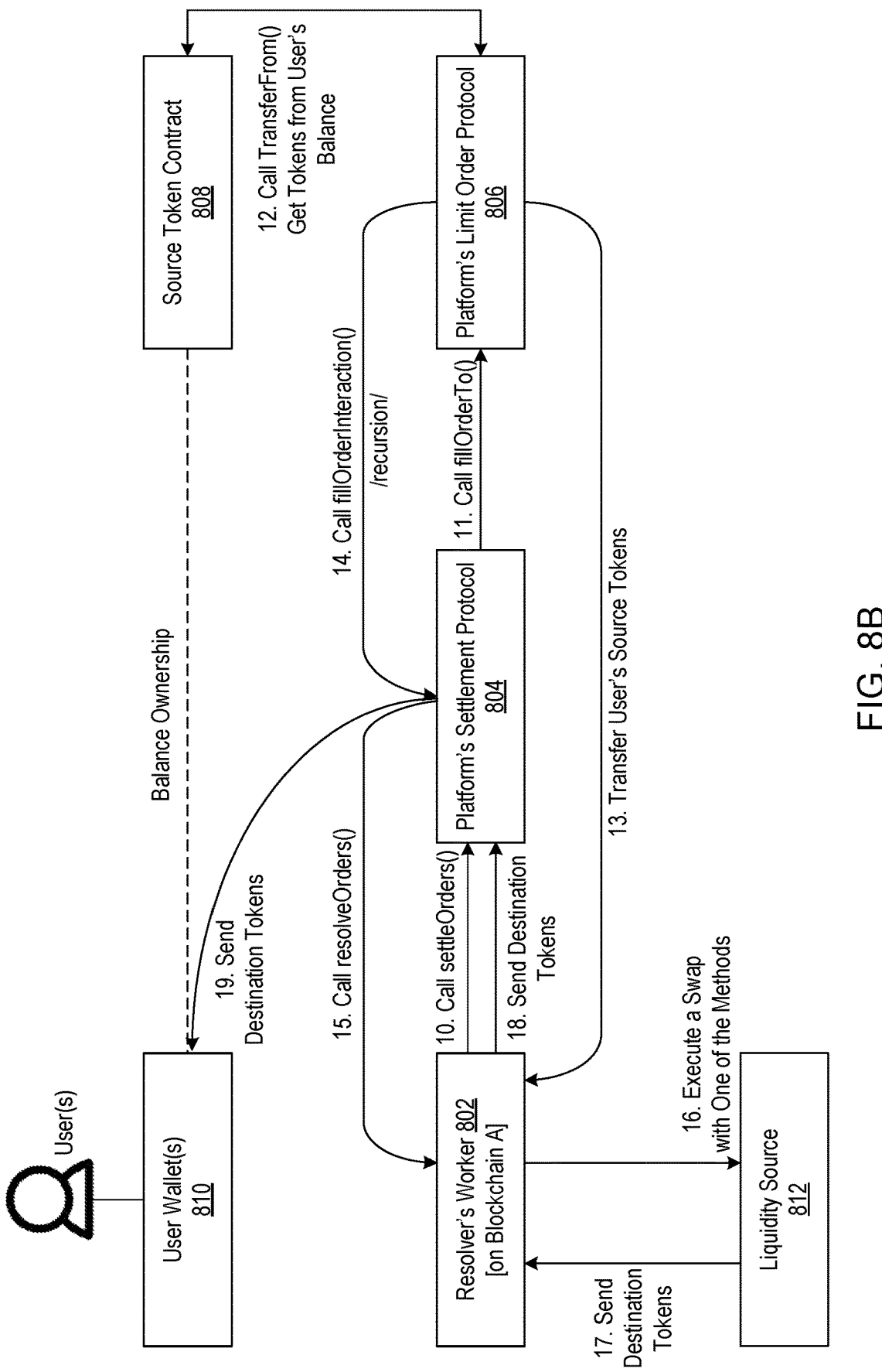
FIG. 8B is a flow diagram that illustrates an onchain phase for executing fills of a gasless decentralized token swap order, in accordance with embodiments described herein.

FIG. 8B is a flow diagram that illustrates an onchain phase for executing fills of a gasless decentralized token swap order, in accordance with embodiments described herein.

More specifically, FIG. 8B is similar to FIG. 8A, but instead of the resolver's worker 802 sending tokens to the user wallet 810, the resolver's worker 802 sends the tokens to the platform's settlement protocol 804, which then sends the tokens to the user wallet 810.

At the end of the offchain phase (e.g., such as the examples depicted in FIG. 6A and FIG. 7), a resolver's backend decides to make a fill of an order that it received from the swap platform's relayer service. More specifically, the backend decides to fill the order at a certain block (e.g., at a certain time window in the duration of an auction), which corresponds to a certain amount of output token to be returned to the user (identifiable based on the generated grid curve). The backend then provides the resolver's worker with information about the selected orders and instructions to fill those orders, which initiates the onchain phase of the swap resolving process. In some cases, the resolver may be able to make several fills in one batch, up to 32 orders. Normally, there are numerous token balances on the resolver worker contract and the backend can take several orders from the "stream" of orders provided by the platform's relayer service and make a sequence of fills.

An example scenario would be a situation where the resolver backend selects 3 swap orders from the relayer to fill: (1) 100 DAI for at least 0.6 WETH; (2) 0.6 WETH for at least 100 DAI; and (3) 0.01 WBTC for at least 36 UNI. Ignoring profit considerations, the business goal of the resolver may be to execute all 3 swaps such that the users get at least the specified minimum amount of output token (in practice, the resolver may take expenses such as gas fees into account to make sure that the swaps are profitable while staying within the quoter-provided framework for maximizing the users' income). The resolver's backend may provide the information about these 3 selected orders to the resolver's worker (e.g., a smart contract or wallet).

As shown in the figure, the resolver's worker 802 may be a smart contract or an externally owned account (EOA) set up by a resolver. The resolver may have more than one worker 802, such as a worker 802 for each blockchain network. The worker 802 may be configured to receive instructions from the resolver's backend about an order to fill (e.g., at the end of the offchain phase illustrated in FIG. 6A) and then kick off a sequence of actions that occurs on the blockchain to execute filling the user's order, such as by calling a settlement protocol 804 of the swap platform to execute the fill of the order. In some embodiments, the resolver's worker 802 must be whitelisted to be able to call a settlement protocol 804 of the swap platform.

The specific implementation for the worker 802 may be up to the resolver. For example, the resolver's worker 802 may have a contract with a resolveOrders( ) function to resolve swaps or a contract that implements the IResolve interface, and the settlement protocol 804 of the swap platform may make a callback to this contract. In some embodiments, the worker 802 is a smart contract and has the resolveOrders( ) function, so the settlement protocol 804 calls back to the same address as it was initially called. In such cases, the worker 802 actually resolves the order and sends the output tokens to the user's wallet. In some embodiments, the worker 802 is a smart contract but the resolveOrders( ) function is implemented in some other contract that the settlement protocol 804 calls back to. In some embodiments, the worker 802 is an EOA that calls the settlement contract 804, but the settlement contract 804, in turn, calls back to a different resolver's smart contract that has the resolveOrders( ) function.

In some embodiments, the worker 802 may call a settleOrders( ) function of the settlement protocol 804 of the swap platform, passing order information for the orders in the batch in a lightweight compressed format of bytes. For instance, the order information for an order that is provided to the settlement protocol 802 may include the input token, an amount of input token, the output token, an amount of output token, and so forth. In some embodiments, for an order, the settlement protocol 804 may obtain the value for a "rate bump" from the quoter service of the swap platform because the current market rate may have changed since the user configured that order. The rate bump may effectively determine the return of the swap transaction, and it may be a percentage difference between the current auction amount and minimal auction amount. For example, if the rate bump value is 50% and the minimum auction amount to return is 500, then the current auction taking amount may be 750. In some embodiments, the settlement protocol 804 may calculate the total fee amount that the resolver should pay to the swap platform.

In some embodiments, the settlement protocol 804 of the swap platform may be a set of smart contracts deployed by the swap platform, which together act as an intermediary between a resolver's worker 802 and the limit order protocol 806 of the swap platform. In some embodiments, the settlement protocol 804 may have swap execution logic on it, such as Dutch auction logic with the limit price decreasing over time (e.g., the duration of the auction) implemented. In some embodiments, the settlement protocol 804 may be configured to receive order fill transaction data from a resolver's worker 802. The settlement protocol 804 may call the limit order protocol 806 of the swap platform to settle the order partially or fully.

In some embodiments, once order information is passed to the settlement protocol 804, the settlement protocol 804 may then call a fillOrderTo( ) function of a limit order protocol 806 of the swap platform, forwarding the data for one of the three orders in the list (e.g., the first order involving 100 DAI for at least 0.6 WETH). In some embodiments, the settlement protocol 804 may inform the limit order protocol 806 that there are additional orders (e.g., 2 more orders in a batch) that will have to be executed afterwards. In some embodiments, the settlement protocol 804 may forward to the limit order protocol 806 either a making or taking amount. Setting the making amount may specify an amount that the resolver would like to receive, and setting the taking amount may specify an amount that the resolver would like to sell. Setting the making amount may result in the taking amount being automatically calculated based on the making amount (and the current market rate), and vice versa. In some embodiments, the settlement protocol 804 may forward the address of the worker 802 contract that will receive the input tokens.

In some embodiments, the limit order protocol 806 of the swap platform may be a set of smart contracts deployed by the swap platform, which together are used for settling limit orders with a dynamic limit price that is implemented on the settlement protocol 804. In some embodiments, the user may provide authority (via permit or approve, depending on the token contract type) so that the limit order protocol can transfer an authorized amount of input token from the user's wallet. In some embodiments, the limit order protocol 806 may have a fillOrderTo( ) function that is used to actually trigger the token transfer from the user to the resolver.

In some embodiments, for the order passed from the settlement protocol 804, the limit order protocol 806 may then call a TransferFrom( ) function of a source token contract 808 to transfer the swap amount of input token from the balance of the user wallet 810 (e.g., the wallet of the user that submitted this particular order) to the resolver's worker 802 contract using ERC20 Solidity interface.

In some embodiments, the source token contract may be an ERC20 contract of the input token (supporting or not supporting permits in addition to approvals) in the swap. The limit order protocol 806, with the user's authorization, may be able to call a transferFrom( ) function of the source token contract 808 to transfer funds from the user's wallet.

Afterwards, the limit order protocol 806 may call back to the settlement protocol 804 with a call to the fillOrderInteraction( ) function of the settlement protocol 804, sending information about any further orders in the batch (e.g., 0.6 WETH for at least 100 DAI, and 0.01 WBTC for at least 36 UNI).

If there are no more orders in the batch, the settlement protocol 804 may call the resolver's worker 802 contract and tell the worker 802 to resolve orders. This may be possible because the worker 802 will import a swap platform interface called IResolver. Alternatively, if there are orders left in the batch, the settlement protocol 804 handles the next order in the batch by again calling the fillOrderTo( ) function of the limit order protocol 806, which will call the Transfer-From( ) function of the source token contract 808 to transfer the swap amount of input token from the wallet of the user that submitted that order (who will likely be different from the user that submitted the first order) to the resolver's worker 802 contract. Afterwards, the limit order protocol 806 may call back to the settlement protocol 804 to check if there are any more orders left in the batch. In this manner, the settlement protocol 804 and the limit order protocol 806 may keep exchanging data to recursively handle orders one-by-one until all the orders are ready to be settled and all the funds are collected from the user wallets that correspond to those orders (e.g., 100 DAI, 0.6 WETH, and 0.01 WBTC for the 3 orders).

Once the resolver's worker 802 contract has received all the funds from the users through the settlement protocol 804 and the limit order protocol 806, the worker 802 can resolve the orders by matching up complementary orders in the batch to reduce the number of additional actions that need to be performed, thereby improving efficiency. For instance, consider the example in which the batch contained three orders from three separate users: 1) 100 DAI for at least 0.6 WETH; (2) 0.6 WETH for at least 100 DAI; and (3) 0.01 WBTC for at least 36 UNI. The first order could be matched with the second order without any additional actions needing to be performed. So the resolver's worker 802 could send 0.6 WETH collected from the user that submitted the second order to the user that submitted the first order, and also send the 100 DAI collected from the user that submitted the first order to the user that submitted the second order. Thus, two out of the three orders can be resolved using the tokens collected from the orders or the tokens that the worker 802 has on balance.

However, in some cases the matching up of complementary orders will not be possible. For example, there is no complementary order for the last order to swap 0.01 WBTC for at least 36 UNI. In such instances, if the worker 802 contract does not have the appropriate token (e.g., 36 UNI) on its balance, the worker 802 can use an external liquidity source 812 to bring 36 UNI to the resolver's worker 802. In some embodiments (not shown), the resolver's backend can call an aggregation information service of the swap platform, such as 1inch Pathfinder, in order to obtain an optimal route and pass it to the worker 802 for execution.

In some embodiments, once the worker 802 has the tokens it needs for filling all the orders, the worker 802 may send all the tokens to the platform's settlement protocol 804, which will then distribute the tokens to the appropriate user wallets 810 to fill all the orders. For instance, in the specific example, the settlement protocol 804 may send 0.6 WETH to the first user's wallet, 100 DAI to the second user's wallet, and 36 UNI to the third user's wallet.

Figure 9:
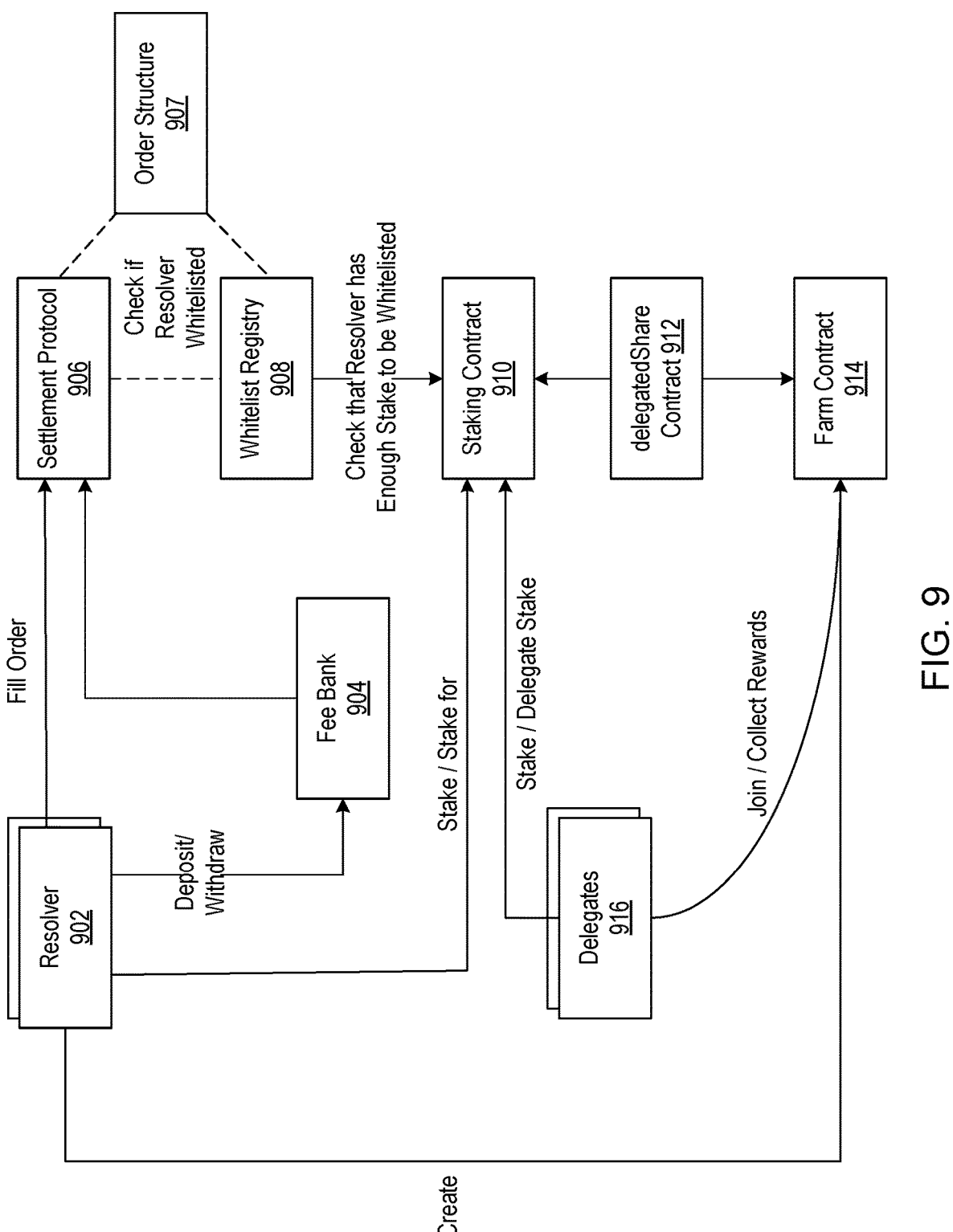
FIG. 9 is a flow diagram that illustrates staking and delegation for a swap platform, in accordance with embodiments described herein.

FIG. 9 is a flow diagram that illustrates staking and delegation for a swap platform, in accordance with embodiments described herein.

As previously discussed, the resolvers 902 may be entities, PMMs, or other persons, who compete in attempts to fill and execute the orders of users of the swap platform. A resolver 902 that fulfills a user's order pays the gas fee to the blockchain network on behalf of the user out of revenue the resolver 902 may have earned through arbitrage efforts or fees for order settlement or positive slippage.

In some embodiments, a resolver 902 may need to be whitelisted in order to participate in filling and executing the orders of users of the swap platform. In some embodiments, in order to be whitelisted, resolvers 902 may need to stake a sufficient amount of platform tokens via the staking contract 910. In some embodiments, the staking contract 910 of a swap platform may be configured to perform various tasks, which can include holding resolvers' stakes, providing current staking weight, prolonging stake locks, and receiving stakes. In some embodiments, there may only be a limited number of spots on the whitelist and a limited number of resolvers 902 in general. In some embodiments, an even smaller number of top resolvers 902 will have the priority right to execute their orders before other resolvers 902.

In some embodiments, some of the platform tokens staked by a resolver 902 can be delegated to the resolver 902 by other users, which are referred to as delegates 916. In some embodiments, the delegates 916 may delegate their platform tokens to a resolver 902 via the staking contract 910. In other words, a resolver 902 may not need to possess all of the platform tokens necessary to become whitelisted because the delegates 916 may effectively lend their platform tokens to the resolver 902. In some embodiments, a delegatedShare smart contract 912 of a swap platform may be configured to keep track of delegation details so that, for example, a resolver 902 can distribute staking rewards.

In some embodiments, whenever a resolver 902 is whitelisted, it may be added to a whitelist registry 908 of the swap platform that is configured to manage a whitelist of resolvers 902 that are permitted to resolve swaps via the swap platform. In some embodiments, the details of whitelisted resolvers are included in the order structure 907.

In some embodiments, whenever a resolver 902 is whitelisted, a farm contract 914 for the resolver 902 and the delegates 916 (that delegated platform tokens to the resolver 902) is created. In some embodiments, the farm contract 914 may be a smart contract. The farm contract 914 may be used to provide additional rewards to the delegates 916. For example, the resolver 902 may decide to distribute part of the slippage that they earn on transactions to the delegates 916 as additional rewards.

In some embodiments, there may be a fee bank 904 of the swap platform that is configured to manage fee deposit/credit, particularly fee deposit/credit for the resolvers 902. In some embodiments, whenever a resolver 902 wins the right to execute a user's order, the resolver 902 may pay a fee for the right to execute the order, which is collected in the fee bank 904. In some embodiments, the fee bank 904 may be part of the swap platform DAO's Treasury. In some embodiments, upon the vote of the swap platform DAO, some of the fees collected in the fee bank 904 for a resolver 902 may be distributed as additional rewards to the delegates 916 for that resolver 902.

In some embodiments, when a user submits an order request to the swap platform, the order may be transmitted to the resolvers 902. In some embodiments, the right to fulfill the user's order may be won by the resolver 902 that: (a) has a higher position in the whitelist; or (b) will be able to execute the order quicker and will gain profit from it; or (c) is the quickest to submit the transaction into the chain of the settlement protocol 906. The funds between the user and the resolver 902 may be transferred by a set of intermediary smart contracts, including a settlement protocol 906 or settlement contract, rather than by the resolver 902 itself.

In some embodiments, the settlement protocol 906 may be an intermediary used by the resolver 902 to perform the swap for the user. In some embodiments, a settlement protocol 906 or settlement contract of a swap platform may be configured to perform various tasks, which can include checking which resolvers 902 are eligible for filling orders (e.g., by checking the whitelist details that are included in the order structure), executing the order filling, implementing Dutch auction logic for orders, transferring user funds to a resolver's implementation contract, collecting fees from resolvers 902, and so forth.

As previously mentioned, in some embodiments, the details of whitelisted resolvers may be included in the order structure 907 contained in the user's order. In some embodiments, a whitelist checker retrieves the whitelist from the Whitelist Registry 908 smart contract and sends it to the quoter (not pictured), which then sends the whitelist to the user, who approves the whitelist as part of the order. In some embodiments, when the settlement contract receives the fill order from the resolver 902, the settlement contract may check the user's order for the whitelist.

Accordingly, in some embodiments, the settlement protocol 906 may validate the resolver address against a whitelist without having to communicate directly with the whitelist registry 908; the settlement protocol 906 may be able to validate the address by checking the list included in the order structure 907.

Accordingly, when a user's order is fulfilled by a resolver 902, the resolver 902 may receive the user's funds through the intermediary smart contracts. The resolver 902 may exchange the user's input token for the specified output token, which is received by the user through the intermediary smart contracts. The resolver 902 may receive slippage fees. And optionally, if the resolver 902 used delegated stakes, the resolver 902 may distribute rewards to its respective delegates 916 through the farm contract 914.

Figure 10:
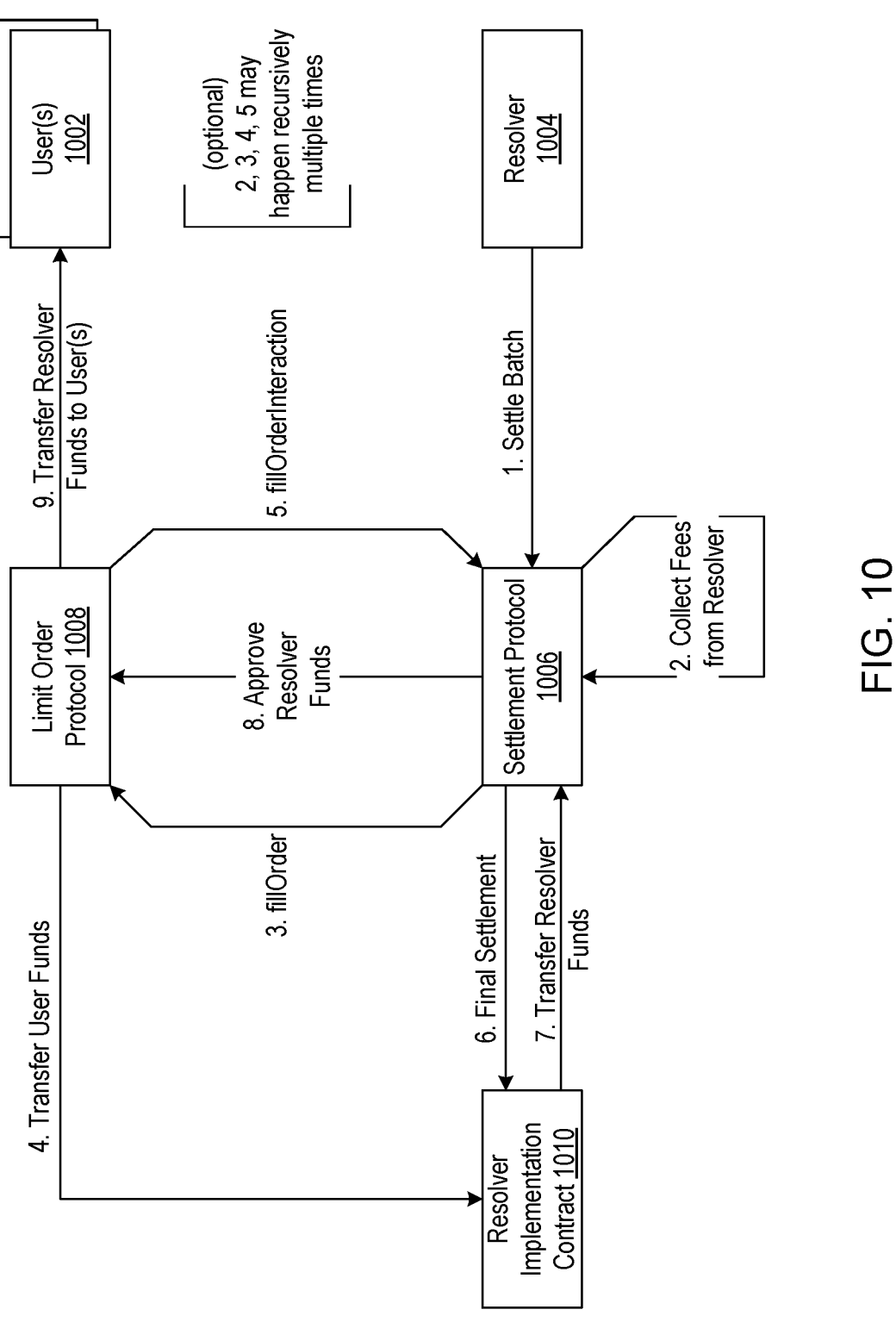
FIG. 10 is a flow diagram that illustrates batch settlement of gasless decentralized token swaps, in accordance with embodiments described herein.

FIG. 10 is a flow diagram that illustrates batch settlement of gasless decentralized token swaps, in accordance with embodiments described herein.

In some embodiments, a resolver 1004 may settle a batch of orders that were submitted by multiple users 1002, and the resolver 1004 may utilize various intermediary smart contracts to transfer funds between their own account and the wallets of the users 1002.

For example, the resolver 1004 may submit the batch of orders to the settlement protocol 1006 of the swap platform. In some embodiments, the settlement protocol 1006 may collect fees from the resolver 1004 (e.g., a fee for the right to execute an order) from the resolver's account. The settlement protocol 1006 may collect a fee for each order in the batch. In some embodiments, these collected fees may be collected into a fee bank of the swap platform.

In some embodiments, the settlement protocol 1006 may pass the orders in the batch to a limit order protocol 1008 of the swap platform. For each order in the batch, the limit order protocol 1008 may transfer the user's funds (e.g., the amount of input token) from the user's wallet to an implementation contract 1010 of the resolver 1004. For example, the limit order protocol 1008 may utilize a source token contract (not shown) to make the transfer. When the user submitted the order, the user may have provided permission or authority for the limit order protocol 1008 to access the funds in the user's wallet and make the transfer.

In some embodiments, once all the user funds associated with the orders in the batch have been transferred to the resolver implementation contract 1010, the settlement protocol 1006 may call the resolver implementation contract 1010 to resolve the orders. The resolver implementation contract 1010 can transfer the output tokens for all the orders in the batch from the resolver's account to the settlement protocol 1006.

In some embodiments, the settlement protocol 1006 can provide these output tokens (obtained from the resolver's funds) to the limit order protocol 1008, which can then distribute those output tokens to the wallets of the users 1002 in accordance with the orders in the batch. In some embodiments, the settlement protocol 1006 may forward the necessary permission or approval to the limit order protocol 1008 for transferring the resolver's funds to the various wallets of the users 1002.

In some embodiments, the steps associated with the numbered arrows 2, 3, 4, and 5 may be performed recursively multiple times so that the resolver 1004 can settle a batch of orders. In some embodiments, the resolver 1004 may perform these steps recursively inside the resolver implementation contract 1010. In some embodiments, the recursion may be optional.

Figure 11:
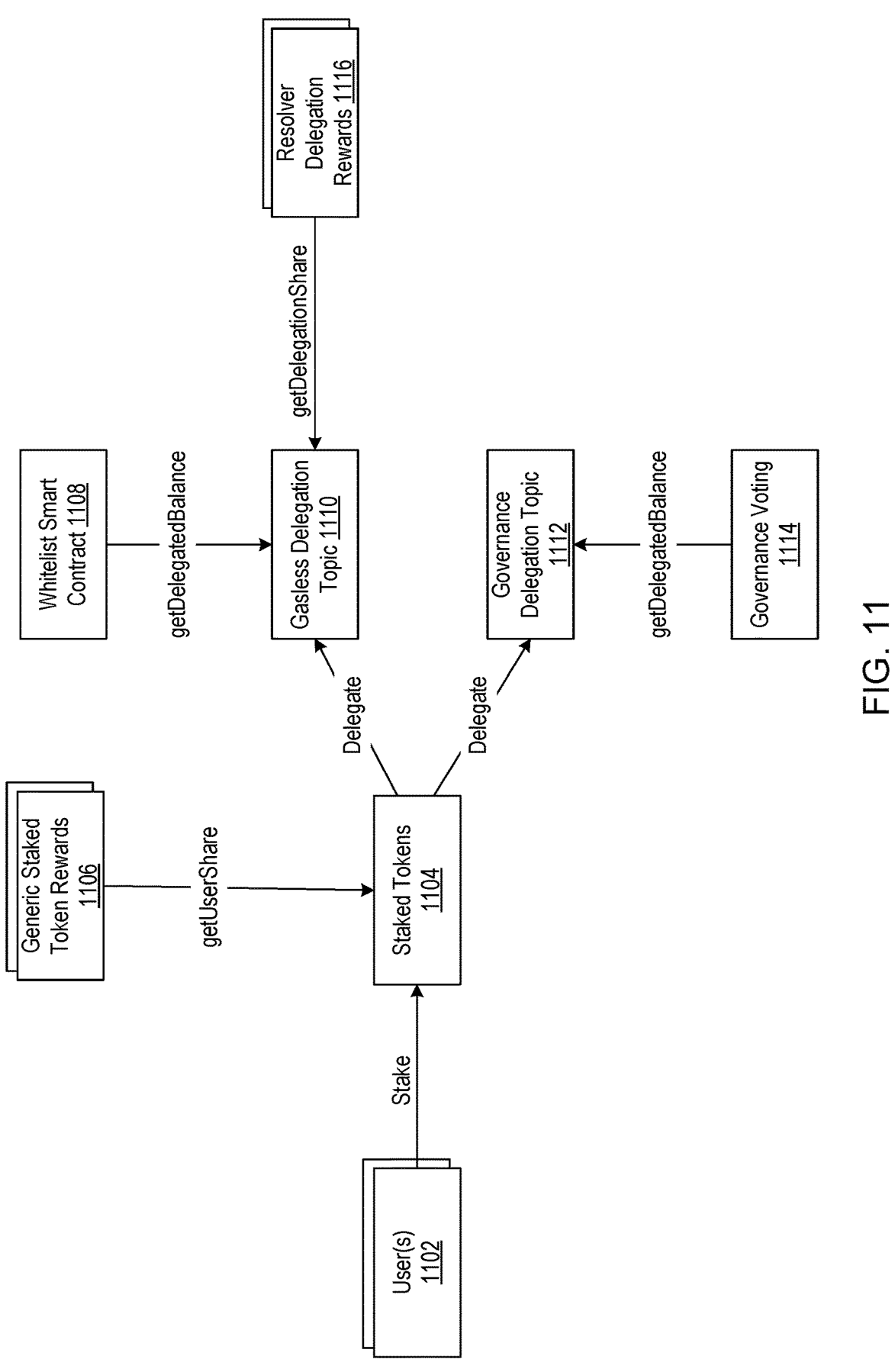
FIG. 11 is a flow diagram illustrating the operation of a delegation system, in accordance with embodiments of the present disclosure.

FIG. 11 is a flow diagram illustrating the operation of a delegation system, in accordance with embodiments of the present disclosure.

In some embodiments, users 1102 may stake platform tokens in their possession (e.g., via a staking contract), which results in a pool of staked tokens 1104. In some embodiments, there may be generic staked token rewards 1106 distributed to the users associated with the pool of staked tokens 1104, which can be distributed based on each user's share of the pool of staked tokens 1104.

In some embodiments, the staked tokens in the pool of staked tokens 1104 can be further delegated to various topics, such as gasless delegation topics 1110 and governance delegation topics 1112. More specifically, a user 1102 may be able to choose to delegate their staked tokens to gasless delegation topics 1110 and/or governance delegation topics 1112.

In some embodiments, the gasless delegation topics 1110 may include the delegation of staked tokens to a particular resolver (e.g., for that resolver to be whitelisted). In such cases, resolver delegation rewards 1116 may be awarded to the users that delegated staked tokens to a whitelisted resolver based on each respective user's delegated share of staked tokens. In some embodiments, the whitelist smart contract 1108 of the swap platform may be able to check the delegated balance of staked tokens for any of the gasless delegation topics 1110. For example, the whitelist smart contract 1108 may be able to check the delegated balance of staked tokens for a particular resolver to determine if that resolver is whitelisted.

In some embodiments, the governance delegation topics 1112 may include various topics associated with governance of the swap platform that users can effectively vote on. Accordingly, the users 1102 may use their staked tokens to take positions on the various governance delegation topics 1112. In such cases, governance voting 1114 may involve checking the balance of staked tokens delegated by each voter for a governance delegation topic 1112.

Figure 12:
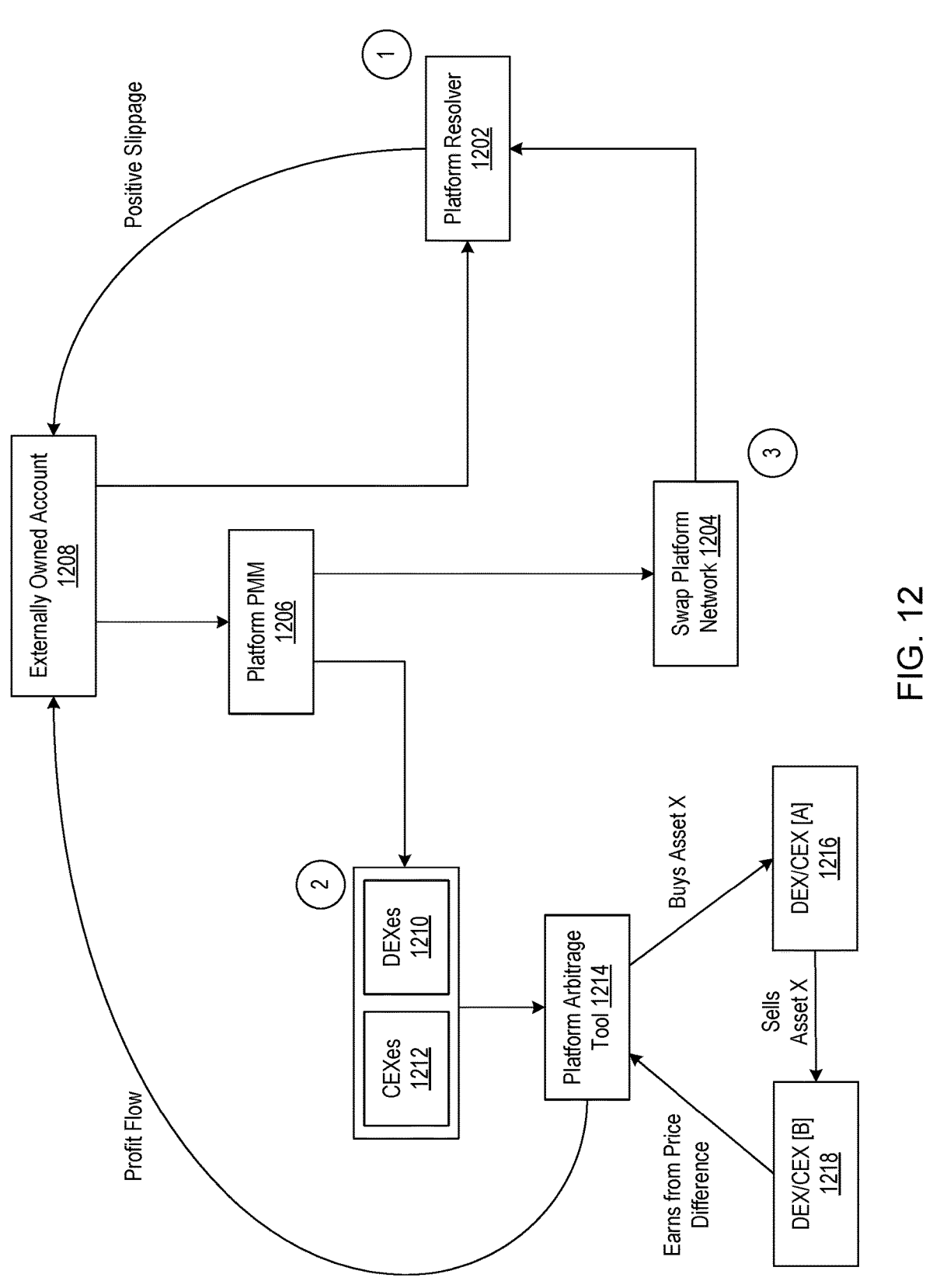
FIG. 12 shows a schematic of a method of market making and arbitrage via a resolver associated with the swap platform, in accordance with embodiments of the present disclosure.

FIG. 12 shows a schematic of a method of market making and arbitrage via a resolver associated with the swap platform. In some embodiments, a platform resolver 1202 (e.g., a resolver associated with the swap platform) may be a resolver in the pool of resolvers for filling orders on the swap platform. The platform resolver 1202 may perform the same roles and tasks of resolvers, as previously discussed. As one of the resolvers for the swap platform, the platform resolver 1202 will earn slippage fees, which can be collected into an Externally Owned Account (EOA) 1208.

In some embodiments, there may be a platform PMM 1206. In some embodiments, the PMM 1206 may function as an arbitrage tool and a liquidity source for centralized exchanges (CEXes) 1212 and decentralized exchanges (DEXes) 1210. In some embodiments, the PMM 1206 can automatically arbitrage and/or determine a liquidity score for CEXes 1212 and DEXes 1210. In some embodiments, the PMM 1206 can perform swaps or changes on a CEX 1212 or a DEX 1210. In some embodiments, the PMM can automatically search for other CEXes 1212 or DEXes 1210 with higher exchange or swap rates. In some embodiments, the platform resolver 1202 may be part of the PMM 1206.

In some embodiments, the PMM 1206 may utilize an arbitrage tool 1214 in order to exchange the assets at one CEX/DEX and further search for opportunities to sell the asset on some other CEX/DEX for a higher price, thereby profiting from the price difference. That profit may then be sent to the EOA 1208. For example, the arbitrage tool 1214 may buy asset X (e.g., a token) at a DEX/CEX A 1216 and then sell the asset X at a DEX/CEX B 1218 at a higher price, earning on the price difference. In some embodiments, the PMM 1206 and the arbitrage tool 1214 may additionally function as a liquidity source for the swap platform network 1204 and other networks that benefit from liquidity circulation.

Computer Systems

Figure 13:
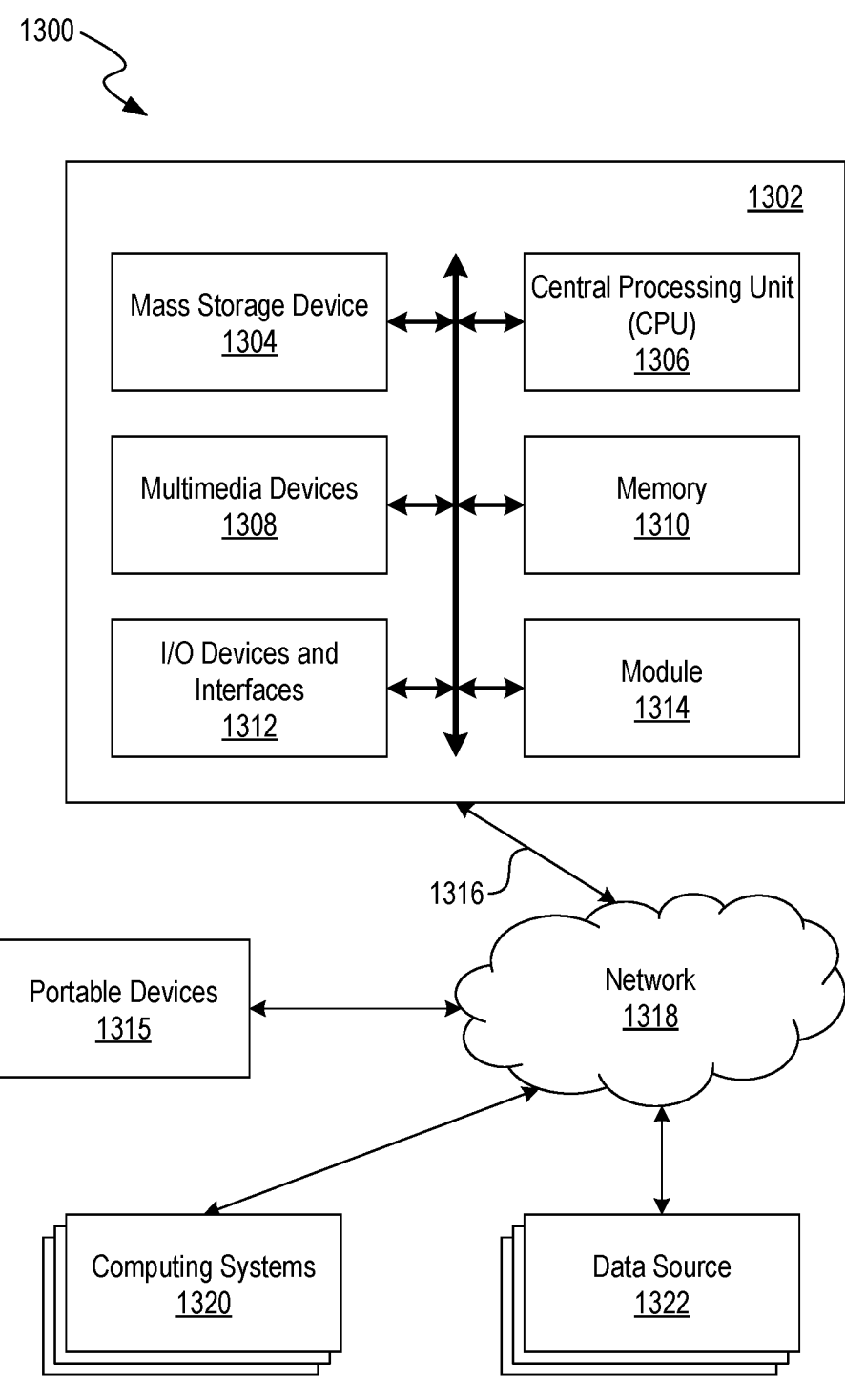
FIG. 13 is a block diagram depicting an embodiment of a computer hardware system configured to run software for implementing the approaches for gasless decentralized token swaps and any systems, methods, and devices disclosed herein.

FIG. 13 is a block diagram depicting an embodiment of a computer hardware system configured to run software for implementing the approaches for gasless decentralized token swaps and any systems, methods, and devices disclosed herein. The example computer system 1302 is in communication with one or more computing systems 1320 and/or one or more data sources 1322 via one or more networks 1318. While FIG. 13 illustrates an embodiment of a computing system 1302, it is recognized that the functionality provided for in the components and modules of computer system 1302 may be combined into fewer components and modules, or further separated into additional components and modules.

The computer system 1302 can comprise a module 1314 that carries out the functions, methods, acts, and/or processes described herein. The module 1314 is executed on the computer system 1302 by a central processing unit 1306 discussed further below.

In general, the word "module," as used herein, refers to logic embodied in hardware or firmware or to a collection of software instructions, having entry and exit points. Modules are written in a program language, such as JAVA, C or C++, Python or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within specially designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1302 includes one or more processing units (CPU) 1306, which may comprise a microprocessor. The computer system 1302 further includes a physical memory 1310, such as random-access memory (RAM) for temporary storage of information, a read only memory (ROM) for permanent storage of information, and a mass storage device 1304, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1302 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1302 includes one or more input/output (I/O) devices and interfaces 1312, such as a keyboard, mouse, touch pad, and printer. The I/O devices and interfaces 1312 can include one or more display devices, such as a monitor, which allows the visual presentation of data to a user. More particularly, a display device provides for the presentation of graphical user interfaces (GUIs) as application software data, and multi-media presentations, for example. The I/O devices and interfaces 1312 can also provide a communications interface to various external devices. The computer system 1302 may comprise one or more multi-media devices 1308, such as speakers, video cards, graphics accelerators, and microphones, for example.

The computer system 1302 may run on a variety of computing devices, such as a server, a Windows server, a Structure Query Language server, a Unix Server, a personal computer, a laptop computer, and so forth. In other embodiments, the computer system 1302 may run on a cluster computer system, a mainframe computer system and/or other computing system suitable for controlling and/or communicating with large databases, performing high volume transaction processing, and generating reports from large databases. The computing system 1302 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a GUI, among other things.

The computer system 1302 illustrated in FIG. 13 is coupled to a network 1318, such as a LAN, WAN, or the Internet via a communication link 1316 (wired, wireless, or a combination thereof). Network 1318 communicates with various computing devices and/or other electronic devices. Network 1318 is communicating with one or more computing systems 1320 and one or more data sources 1322. The module 1314 may access or may be accessed by computing systems 1320 and/or data sources 1322 through a web-enabled user access point. Connections may be a direct physical connection, a virtual connection, or other connection type. The web-enabled user access point may comprise a browser module that uses text, graphics, audio, video, and other media to present data and to allow interaction with data via the network 1318.

Access to the module 1314 of the computer system 1302 by computing systems 1320 and/or by data sources 1322 may be through a web-enabled user access point such as the computing systems' 1320 or data source's 1322 personal computer, cellular phone, smartphone, laptop, tablet computer, e-reader device, audio player, or another device capable of connecting to the network 1318. Such a device may have a browser module that is implemented as a module that uses text, graphics, audio, video, and other media to present data and to allow interaction with data via the network 1318.

The output module may be implemented as a combination of an all-points addressable display such as a cathode ray tube (CRT), a liquid crystal display (LCD), a plasma display, or other types and/or combinations of displays. The output module may be implemented to communicate with input devices 1312 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 1302 may comprise a physical or logical connection established between a remote microprocessor and a mainframe host computer for the express purpose of uploading, downloading, or viewing interactive data and databases on-line in real time. The remote microprocessor may be operated by an entity operating the computer system 1302, including the client server systems or the main server system, an/or may be operated by one or more of the data sources 1322 and/or one or more of the computing systems 1320. In some embodiments, terminal emulation software may be used on the microprocessor for participating in the micro-mainframe link.

In some embodiments, computing systems 1320 that are internal to an entity operating the computer system 1302 may access the module 1314 internally as an application or process run by the CPU 1306.

In some embodiments, one or more features of the systems, methods, and devices described herein can utilize a URL and/or cookies, for example, for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1302 may include one or more internal and/or external data sources (for example, data sources 1322). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1302 may also access one or more data sources 1322. The data sources 1322 may be stored in a database or data repository. The computer system 1302 may access the one or more data sources 1322 through a network 1318 or may directly access the database or data repository through I/O devices and interfaces 1312. The data repository storing the one or more data sources 1322 may reside within the computer system 1302.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, or for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

We claim:

1. A computer-implemented method performed by a swap platform, the method comprising:

receiving, from an application of a user device of a user, an order to swap an input token in exchange for an output token without the user paying a gas fee, wherein the order is received via a user interface of the application, wherein the application comprises a web-based application accessed by the user device via a browser, wherein the order comprises an off chain data structure digitally signed by the user and comprises:

a set of parameters;

an indication of a plurality of whitelisted resolvers, the indication cryptographically bound to an order hash;

a block-indexed grid curve function that defines auction price thresholds over a block window;

a signature that authorizes a settlement or limit-order contract to transfer a specified amount of the input token; and an order identifier, wherein the user interface is configured to receive the plurality of parameters comprising:

the input token;

the specified amount of the input token;

the output token;

a maximum swap threshold comprising a starting amount of the output token;

a minimum swap threshold;

a time threshold; and a swap approval;

providing the order to the plurality of whitelisted resolvers to fulfill via a Dutch auction that reflects the plurality of parameters in the order, wherein the Dutch auction comprises an auction price that begins at the maximum swap threshold and decreases to the minimum swap threshold by the time threshold;

receiving, by a settlement smart contract and from a resolver of the plurality of resolvers, instructions for the settlement smart contract to fulfill the order at the auction price via a distributed blockchain network, wherein the resolver comprises a resolver worker address, wherein the settlement smart contract:

verifies the resolver by validating a proof against the indication of the plurality of whitelisted resolvers in the order;

verifies that no prior user-originated on chain transaction exists for the order identifier;

computes a current-block auction price by combining the block-indexed grid curve function with a rate-bump value retrieved from an on chain quoter mapping keyed by the order identifier and current block number;

validates the signature and pulls the input token from a wallet of the user via an order protocol call; and atomically debits a pre-funded balance of the resolver, wherein the distributed blockchain network operates on a plurality of nodes forming a peer-to-peer computer network, wherein the settlement smart contract comprises autonomous code integrated into the distributed blockchain network and hosted on the plurality of nodes of the distributed blockchain network, wherein fulfillment of the order comprises exchange of at least one cryptocurrency or token and occurs via execution on the distributed blockchain network, wherein the swap platform is implemented across the plurality of nodes of the distributed blockchain network, and wherein the resolver pays a gas fee on behalf of the user for fulfilling the order; and causing the amount of the input token in a wallet of the user to be swapped for an amount of the output token.

2. The computer-implemented method of claim 1, wherein the swap authorization permits a smart contract to retrieve tokens from and send tokens to the wallet of the user.

3. The computer-implemented method of claim 1, wherein the set of parameters specified by the order further comprises an execution approach.

4. The computer-implemented method of claim 1, wherein the set of parameters specified by the order further comprises an execution approach, and wherein the execution approach specifies how the auction price decays over time until the minimum swap threshold is reached.

5. The computer-implemented method of claim 1, wherein the set of parameters specified by the order are configured by the user through a frontend application operating on the user device.

6. The computer-implemented method of claim 1, wherein the Dutch auction provides a top resolver a priority right to fulfill the order before other resolvers in the plurality of resolvers.

7. A computer system comprising:

one or more processing devices; and one or more memory devices operably coupled to the one or more processing devices, the one or more memory devices storing executable code that, when executed by the one or more processing devices, causes the one or more processing devices to:

receive, from an application of a user device of a user, an order to swap an input token in exchange for an output token without the user paying a gas fee, wherein the order is received via a user interface of the application, wherein the application comprises a web- based application accessed by the user device via a browser, wherein the order comprises an off chain data structure digitally signed by the user and comprises:

a set of parameters;

an indication of a plurality of whitelisted resolvers, the indication cryptographically bound to an order hash;

a block-indexed grid curve function that defines auction price thresholds over a block window;

a signature that authorizes a settlement or limit-order contract to transfer a specified amount of the input token; and an order identifier, wherein the user interface is configured to receive the plurality of parameters comprising:

the input token;

the specified amount of the input token;

the output token;

a maximum swap threshold comprising a starting amount of the output token;

a minimum swap threshold;

a time threshold; and a swap approval;

provide the order to the plurality of whitelisted resolvers to fulfill via a Dutch auction that reflects the plurality of parameters in the order, wherein the Dutch auction comprises an auction price that begins at the maximum swap threshold and decreases to the minimum swap threshold by the time threshold;

receive, by a settlement smart contract and from a resolver of the plurality of resolvers, instructions for the settlement smart contract to fulfill the order at the auction price via a distributed blockchain network, wherein the resolver comprises a resolver worker address, wherein the settlement smart contract:

verifies the resolver by validating a proof against the indication of the plurality of whitelisted resolvers in the order;

verifies that no prior user-originated on chain transaction exists for the order identifier;

computes a current-block auction price by combining the block-indexed grid curve function with a rate-bump value retrieved from an on chain quoter mapping keyed by the order identifier and current block number;

validates the signature and pulls the input token from a wallet of the user via an order protocol call; and atomically debits a pre-funded balance of the resolver, wherein the distributed blockchain network operates on a plurality of nodes forming a peer-to-peer computer network, wherein the settlement smart contract comprises autonomous code integrated into the distributed blockchain network and hosted on the plurality of nodes of the distributed blockchain network, wherein fulfillment of the order comprises exchange of at least one cryptocurrency or token and occurs via execution on the distributed blockchain network, wherein the swap platform is implemented across the plurality of nodes of the distributed blockchain network, and wherein the resolver pays a gas fee on behalf of the user for fulfilling the order; and cause the amount of the input token in a wallet of the user to be swapped for an amount of the output token.

8. The computer system of claim 7, wherein the swap authorization permits a smart contract to retrieve tokens from and send tokens to the wallet of the user.

9. The computer system of claim 7, wherein the set of parameters specified by the order further comprises an execution approach.

10. The computer system of claim 7, wherein the set of parameters specified by the order further comprises an execution approach, and wherein the execution approach specifies how the auction price decays over time until the minimum swap threshold is reached.

11. The computer system of claim 7, wherein the set of parameters specified by the order are configured by the user through a frontend application operating on the user device.

12. The computer system of claim 7, wherein the Dutch auction provides a top resolver a priority right to fulfill the order before other resolvers in the plurality of resolvers.

13. A non-transient computer readable medium containing program instructions for causing a computer system to perform the steps of:

receiving, from an application of a user device of a user, an order to swap an input token in exchange for an output token without the user paying a gas fee, wherein the order is received via a user interface of the application, wherein the application comprises a web-based application accessed by the user device via a browser, wherein the order comprises an off chain data structure digitally signed by the user and comprises:

a set of parameters;

an indication of a plurality of whitelisted resolvers, the indication cryptographically bound to an order hash;

a block-indexed grid curve function that defines auction price thresholds over a block window;

a signature that authorizes a settlement or limit-order contract to transfer a specified amount of the input token; and an order identifier, wherein the user interface is configured to receive the plurality of parameters comprising:

the input token;

the specified amount of the input token;

the output token;

a maximum swap threshold comprising a starting amount of the output token;

a minimum swap threshold;

a time threshold; and a swap approval;

providing the order to the plurality of whitelisted resolvers to fulfill via a Dutch auction that reflects the plurality of parameters in the order, wherein the Dutch auction comprises an auction price that begins at the maximum swap threshold and decreases to the minimum swap threshold by the time threshold;

receiving, by a settlement smart contract and from a resolver of the plurality of resolvers, instructions for the settlement smart contract to fulfill the order at the auction price via a distributed blockchain network, wherein the resolver comprises a resolver worker address, wherein the settlement smart contract:

verifies the resolver by validating a proof against the indication of the plurality of whitelisted resolvers in the order;

verifies that no prior user-originated on chain transaction exists for the order identifier;

computes a current-block auction price by combining the block-indexed grid curve function with a rate-bump value retrieved from an on chain quoter mapping keyed by the order identifier and current block number;

validates the signature and pulls the input token from a wallet of the user via an order protocol call; and atomically debits a pre-funded balance of the resolver, wherein the distributed blockchain network operates on a plurality of nodes forming a peer-to-peer computer network, wherein the settlement smart contract comprises autonomous code integrated into the distributed blockchain network and hosted on the plurality of nodes of the distributed blockchain network wherein fulfillment of the order comprises exchange of at least one cryptocurrency or token and occurs via execution on the distributed blockchain network, wherein the swap platform is implemented across the plurality of nodes of the distributed blockchain network, and wherein the resolver pays a gas fee on behalf of the user for fulfilling the order; and causing the amount of the input token in a wallet of the user to be swapped for an amount of the output token.

14. The non-transient computer readable medium of claim 13, wherein the swap authorization permits a smart contract to retrieve tokens from and send tokens to the wallet of the user.

* * * * *